(12) United States Patent
Chan

(10) Patent No.: US 7,840,176 B2
(45) Date of Patent: *Nov. 23, 2010

(54) INFORMATION DISTRIBUTION AND PROCESSING SYSTEM

(75) Inventor: Hark C. Chan, Cupertino, CA (US)

(73) Assignee: Email Link Corporation, Newport Beach, CA (US)

( * ) Notice: Subject to any disclaimer, the term of this patent is extended or adjusted under 35 U.S.C. 154(b) by 710 days.

This patent is subject to a terminal disclaimer.

(21) Appl. No.: 11/644,492

(22) Filed: Dec. 22, 2006

(65) Prior Publication Data

US 2007/0107031 A1    May 10, 2007

Related U.S. Application Data

(63) Continuation of application No. 10/322,624, filed on Dec. 19, 2002, now Pat. No. 7,181,758, which is a continuation of application No. 10/079,257, filed on Feb. 19, 2002, now abandoned, which is a continuation of application No. 09/699,022, filed on Oct. 27, 2000, now abandoned, which is a continuation of application No. 09/480,226, filed on Jan. 10, 2000, now Pat. No. 6,347,215, which is a continuation of application No. 08/939,368, filed on Sep. 29, 1997, now Pat. No. 6,021,307, which is a continuation-in-part of application No. 08/644,838, filed on May 10, 1996, now abandoned, which is a continuation-in-part of application No. 08/279,424, filed on Jul. 25, 1994, now abandoned.

(51) Int. Cl.
*H04H 20/71* (2008.01)
*H04N 5/445* (2006.01)
*G06F 3/00* (2006.01)
*G06F 13/00* (2006.01)
*G06F 9/32* (2006.01)
*G06F 15/16* (2006.01)
*H04W 4/00* (2009.01)

(52) U.S. Cl. .......................... 455/3.01; 725/66; 725/105; 725/110; 725/38; 340/7.21; 370/338; 370/328; 709/206

(58) Field of Classification Search ................ 455/3.01; 370/328, 338; 340/7.29; 709/206, 219; 725/38, 725/66, 110, 105

See application file for complete search history.

(56) References Cited

U.S. PATENT DOCUMENTS 3,824,597 A    7/1974   Berg (Continued)

FOREIGN PATENT DOCUMENTS

WO    WO 89/08299    9/1989
WO    93/09631       5/1993

OTHER PUBLICATIONS

A New Playing Field: Indoor baseball like never before, and talk about artificial turf . . . ; The Seattle Times; May 29, 1994; pp. C1, C6.

(Continued)

*Primary Examiner*—William D Cumming
(74) *Attorney, Agent, or Firm*—Martin & Ferraro, LLP

(57) ABSTRACT

An information distribution and processing system contains a sender and a plurality of processing units. The sender delivers a set of digital data, without receiving a request signal, to the plurality of processor units. The set of digital data contains a first set of displayable data, a second set of displayable data, at least one non-displayable symbol, and at least one linking reference associated with the second set of displayable data. If desired, a user can select the second set of displayable data. The associated linking reference is sent to a database. The database contains additional information. The associated linking reference is used by the data to search for the additional information, and returns the requested information to the user.

16 Claims, 3 Drawing Sheets

U.S. PATENT DOCUMENTS

| | | |
|---|---|---|
| 3,967,202 A | 6/1976 | Batz |
| 4,054,911 A | 10/1977 | Fletcher et al. |
| 4,081,832 A | 3/1978 | Sherman |
| 4,191,860 A | 3/1980 | Weber |
| 4,215,406 A | 7/1980 | Gomola et al. |
| 4,215,407 A | 7/1980 | Gomola et al. |
| 4,307,416 A | 12/1981 | Spano |
| 4,430,639 A | 2/1984 | Bennett |
| 4,442,502 A | 4/1984 | Friend et al. |
| 4,528,643 A | 7/1985 | Freeny, Jr. |
| 4,556,904 A | 12/1985 | Monat |
| 4,563,702 A | 1/1986 | Heller |
| 4,598,318 A | 7/1986 | Robbins |
| 4,635,113 A | 1/1987 | Okada et al. |
| 4,649,384 A | 3/1987 | Sheafor et al. |
| 4,694,490 A | 9/1987 | Harvey et al. |
| 4,734,858 A | 3/1988 | Sclafy |
| 4,736,365 A | 4/1988 | Stern |
| 4,742,544 A | 5/1988 | Kupnicki et al. |
| 4,768,087 A | 8/1988 | Taub et al. |
| 4,823,388 A | 4/1989 | Mizutani et al. |
| 4,827,508 A | 5/1989 | Shear |
| 4,835,683 A | 5/1989 | Phillips et al. |
| 4,860,352 A | 8/1989 | Laurance et al. |
| 4,873,662 A | 10/1989 | Sargent |
| 4,877,404 A | 10/1989 | Warren et al. |
| 4,899,292 A | 2/1990 | Montagna et al. |
| 4,965,825 A | 10/1990 | Harvey et al. |
| 4,987,595 A | 1/1991 | Marino, Jr. et al. |
| 5,003,384 A | 3/1991 | Durden et al. |
| 5,010,571 A | 4/1991 | Katznelson |
| 5,029,206 A | 7/1991 | Marino, Jr. et al. |
| 5,058,000 A | 10/1991 | Cox |
| 5,081,678 A | 1/1992 | Kaufman et al. |
| 5,083,271 A | 1/1992 | Thacher et al. |
| 5,099,516 A | 3/1992 | Durkin et al. |
| 5,103,476 A | 4/1992 | Waite et al. |
| 5,124,909 A | 6/1992 | Blakely |
| 5,128,981 A | 7/1992 | Tsukamoto et al. |
| 5,132,680 A | 7/1992 | Tezuka et al. |
| 5,155,847 A | 10/1992 | Kirouac et al. |
| 5,157,783 A | 10/1992 | Anderson et al. |
| 5,185,794 A | 2/1993 | Thompson et al. |
| 5,208,671 A | 5/1993 | Tarrant |
| 5,208,857 A | 5/1993 | Lebrat |
| 5,214,697 A | 5/1993 | Saito |
| 5,222,134 A | 6/1993 | Waite et al. |
| 5,237,411 A | 8/1993 | Fink et al. |
| 5,239,540 A | 8/1993 | Rovira et al. |
| 5,241,671 A | 8/1993 | Reed et al. |
| 5,247,347 A | 9/1993 | Litteral et al. |
| 5,247,575 A | 9/1993 | Sprague et al. |
| 5,265,065 A | 11/1993 | Turtle |
| 5,267,314 A | 11/1993 | Stambler |
| 5,282,247 A | 1/1994 | McLean et al. |
| 5,283,828 A | 2/1994 | Saunders et al. |
| 5,319,542 A | 6/1994 | King, Jr. et al. |
| 5,319,707 A | 6/1994 | Wasilewski et al. |
| 5,321,748 A | 6/1994 | Zeidler et al. |
| 5,321,750 A | 6/1994 | Nadan |
| 5,323,148 A | 6/1994 | Olazabal et al. |
| 5,327,174 A | 7/1994 | Kim |
| 5,335,275 A | 8/1994 | Millar et al. |
| 5,335,277 A | 8/1994 | Harvey et al. |
| 5,335,278 A | 8/1994 | Matchett et al. |
| 5,341,429 A | 8/1994 | Stringer et al. |
| 5,343,494 A | 8/1994 | Averst et al. |
| 5,347,632 A | 9/1994 | Filepp et al. |
| 5,361,399 A | 11/1994 | Linquist et al. |
| 5,365,591 A | 11/1994 | Carswell et al. |
| 5,377,266 A | 12/1994 | Katta et al. |
| 5,381,476 A | 1/1995 | Kimoto et al. |
| 5,383,185 A | 1/1995 | Armbruster et al. |
| 5,384,835 A | 1/1995 | Wheeler et al. |
| 5,388,101 A | 2/1995 | Dinkins |
| 5,392,023 A | 2/1995 | D'Avello et al. |
| 5,392,353 A | 2/1995 | Morales |
| 5,394,559 A | 2/1995 | Hemmie et al. |
| 5,400,403 A | 3/1995 | Fahn et al. |
| 5,404,505 A | 4/1995 | Levinson |
| 5,414,644 A | 5/1995 | Seaman et al. |
| 5,418,908 A * | 5/1995 | Keller et al. ................ 709/206 |
| 5,418,948 A | 5/1995 | Turtle |
| 5,432,798 A | 7/1995 | Blair |
| 5,442,771 A | 8/1995 | Filepp et al. |
| 5,444,769 A | 8/1995 | Koen et al. |
| 5,446,891 A | 8/1995 | Kaplan et al. |
| 5,452,356 A | 9/1995 | Albert |
| 5,457,746 A | 10/1995 | Dolphin |
| 5,481,542 A | 1/1996 | Logston et al. |
| 5,488,725 A | 1/1996 | Turtle et al. |
| 5,489,952 A | 2/1996 | Gove et al. |
| 5,506,984 A | 4/1996 | Miller |
| 5,509,070 A | 4/1996 | Schull |
| 5,510,992 A | 4/1996 | Kara |
| 5,519,866 A | 5/1996 | Lawrence |
| 5,524,073 A | 6/1996 | Stambler |
| 5,528,490 A | 6/1996 | Hill |
| 5,530,740 A | 6/1996 | Irribarren |
| 5,530,751 A | 6/1996 | Morris |
| 5,534,857 A | 7/1996 | Laing et al. |
| 5,539,449 A | 7/1996 | Blahut et al. |
| 5,543,789 A | 8/1996 | Behr et al. |
| 5,555,303 A | 9/1996 | Stambler |
| 5,555,407 A | 9/1996 | Cloutier et al. |
| 5,559,936 A | 9/1996 | Poulter et al. |
| 5,563,946 A | 10/1996 | Cooper et al. |
| 5,592,551 A | 1/1997 | Lett |
| 5,613,004 A | 3/1997 | Cooperman et al. |
| 5,625,690 A | 4/1997 | Michel et al. |
| 5,629,867 A | 5/1997 | Goldman |
| 5,640,192 A | 6/1997 | Garfinkle |
| 5,646,998 A | 7/1997 | Stambler |
| 5,668,592 A | 9/1997 | Spaulding, II |
| 5,668,950 A | 9/1997 | Kikuchi et al. |
| 5,677,953 A | 10/1997 | Dolphin |
| 5,682,318 A | 10/1997 | Kara |
| 5,692,073 A | 11/1997 | Cass |
| 5,694,546 A | 12/1997 | Reisman |
| 5,697,844 A | 12/1997 | Von Kohorn |
| 5,721,827 A | 2/1998 | Logan et al. |
| 5,734,853 A | 3/1998 | Hendricks et al. |
| 5,737,595 A | 4/1998 | Cohen et al. |
| 5,742,677 A | 4/1998 | Pinder et al. |
| 5,754,646 A | 5/1998 | Williams et al. |
| 5,754,864 A | 5/1998 | Hill |
| 5,757,913 A | 5/1998 | Bellare et al. |
| 5,761,649 A | 6/1998 | Hill |
| 5,774,886 A | 6/1998 | Kara |
| 5,778,076 A | 7/1998 | Kara et al. |
| 5,784,609 A | 7/1998 | Kurihara |
| 5,793,302 A | 8/1998 | Stambler |
| 5,796,967 A | 8/1998 | Filepp et al. |
| 5,812,929 A | 9/1998 | Tsutsui et al. |
| 5,818,911 A | 10/1998 | Kawashima |
| 5,819,034 A | 10/1998 | Joseph et al. |
| 5,870,474 A | 2/1999 | Wasilewski et al. |
| 5,875,108 A | 2/1999 | Hoffberg et al. |
| 5,887,065 A | 3/1999 | Audebert |
| 5,887,243 A | 3/1999 | Harvey et al. |
| 5,899,998 A | 5/1999 | McGauley et al. |
| 5,933,604 A | 8/1999 | Inakoshi |
| 5,936,541 A | 8/1999 | Stambler |
| 5,954,793 A | 9/1999 | Stutman |

| | | |
|---|---|---|
| 5,961,593 A | 10/1999 | Gabber et al. |
| 5,968,129 A | 10/1999 | Dillon et al. |
| 5,970,471 A | 10/1999 | Hill |
| 5,974,148 A | 10/1999 | Stambler |
| 5,990,927 A | 11/1999 | Hendricks |
| 5,995,628 A | 11/1999 | Kitaj et al. |
| 5,995,725 A | 11/1999 | Dillon |
| 5,999,525 A | 12/1999 | Krishnaswamy |
| 5,999,934 A | 12/1999 | Cohen et al. |
| 6,005,938 A | 12/1999 | Banker et al. |
| 6,021,307 A | 2/2000 | Chan |
| 6,029,142 A | 2/2000 | Hill |
| 6,029,150 A | 2/2000 | Kravitz |
| 6,044,365 A | 3/2000 | Cannon et al. |
| 6,055,314 A | 4/2000 | Spies et al. |
| 6,076,094 A | 6/2000 | Cohen et al. |
| 6,078,612 A | 6/2000 | Bertrand et al. |
| 6,089,453 A | 7/2000 | Kayser |
| 6,097,816 A | 8/2000 | Momiki et al. |
| 6,125,388 A | 9/2000 | Reisman |
| 6,131,088 A | 10/2000 | Hill |
| 6,185,265 B1 | 2/2001 | Campanella |
| 6,188,869 B1* | 2/2001 | Chan ............................ 725/66 |
| 6,233,568 B1 | 5/2001 | Kara |
| 6,253,059 B1* | 6/2001 | Chan ......................... 340/7.21 |
| 6,266,654 B1 | 7/2001 | Schull |
| 6,289,200 B1 | 9/2001 | Chan |
| 6,314,574 B1 | 11/2001 | Chan |
| 6,317,785 B1* | 11/2001 | Chan ........................... 709/219 |
| 6,339,693 B1* | 1/2002 | Chan ......................... 455/3.01 |
| 6,343,380 B1 | 1/2002 | Chan |
| 6,347,215 B1 | 2/2002 | Chan |
| 6,349,409 B1* | 2/2002 | Chan ........................... 725/105 |
| 6,397,387 B1 | 5/2002 | Rosin et al. |
| 6,473,860 B1 | 10/2002 | Chan |
| 6,600,908 B1 | 7/2003 | Chan |
| 6,609,202 B1 | 8/2003 | Chan |
| 6,665,797 B1 | 12/2003 | Keung |
| 6,766,140 B1* | 7/2004 | Chan ......................... 455/3.01 |
| 6,772,344 B1 | 8/2004 | Chan |
| 6,789,198 B1 | 9/2004 | Chan |
| 7,072,849 B1 | 7/2006 | Filepp et al. |
| 7,181,758 B1* | 2/2007 | Chan ........................... 725/110 |
| 7,508,789 B2* | 3/2009 | Chan ........................... 370/328 |
| 7,522,554 B2* | 4/2009 | Chan ........................... 370/328 |
| 2002/0069282 A1 | 6/2002 | Reisman |
| 2002/0112171 A1 | 8/2002 | Ginter et al. |
| 2002/0124055 A1 | 9/2002 | Reisman |
| 2002/0129094 A1 | 9/2002 | Reisman |
| 2002/0186887 A1 | 12/2002 | Rhoads |
| 2007/0107031 A1* | 5/2007 | Chan ........................... 725/110 |
| 2007/0258401 A1* | 11/2007 | Chan ........................... 370/328 |
| 2007/0258430 A1* | 11/2007 | Chan ........................... 370/338 |
| 2007/0271581 A1* | 11/2007 | Chan ............................. 725/38 |

OTHER PUBLICATIONS

Aaland; Microsoft's new field of dreams; Folio; Apr. 15, 1994.
Academic Press, Inc.; Academic Press Dictionary of Science and Technology; 1992; pp. 660, 1805, and 2151.
Alber; Videotex/Teletext: Principles & Practices; 1985; cover.
Alta Oben; Review of Nautilus from May 1995 Monitor; Feb. 27, 2002.
Ambrosius; Breaking New Ground: Franklin and Microsoft Enter the Fantasy Baseball Market With Innovative New Products; Fantasy Baseball; vol. 5, No. 3; May 1994.
Americ Disc Inc.; Advertisement "We're Crazy About Our Business . . . We Are Committed To You." Identified in Appendix B of Defendants' P.R. 3-3 Invalidity Contentions in Disc Link v. H&R Case No. 5:06-CV-00295-DF dated Nov. 1, 2007.
Americ Disc Inc.; CD-ROM Purchase Order Form to CD Publishing Corp.; Dec. 20, 1993.
Americ Disc Inc.; Facsimile from Frank Johansen to Mark Frass with CD Publishing Corporation CD-ROM Services Price List; May 31, 1994.
Americ Disc Inc.; Invoice No. 126225 to CD Publishing Corporation; Jan. 5, 1994.
Americ Disc Inc.; Procedure for Shipping Tapes, Films and Printed Matter. Identified in Appendix B of Defendants' P.R. 3-3 Invalidity Contentions in Disc Link v. H&R Case No. 5:06-CV-00295-DF dated Nov. 1, 2007.
America Online, Inc.; America Online: Welcome New Member, Version 2.0; 1994.
Anita Malnig; Customers Build Their Own Mine Vehicles Via Multimedia; Jul. 26, 1993.
Apple Computer, Inc.; Apple Developer Group; Jun. 15, 1989.
Apple Computer, Inc.; Apple Directions; The Developer Business Report; Aug. 1994.
Apple Computer, Inc.; Apple II, AppleLink Personal Edition Apple IIc Plus Addendum. (1988).
Apple Computer, Inc.; Apple II, AppleLink Personal Edition; Aug. 1988.
Apple Computer, Inc.; Apple Macintosh HyperCard User's Guide and HyperCard Quick Reference Card; 1987; pp. 1-221.
Apple Computer, Inc.; Apple Price List; Sep. 1, 1993.
Apple Computer, Inc.; Apple Remote Access Client User's Guide for Macintosh; (1993).
Apple Computer, Inc.; AppleLink 6.0 Ancillary Materials; 1990.
Apple Computer, Inc.; AppleLink 6.0 User's Guide; 1990; pp. i-xi, 1-131.
Apple Computer, Inc.; AppleLink 6.1 Program Disk 1; 1991.
Apple Computer, Inc.; AppleLink 6.1 Program Disk 2; 1991.
Apple Computer, Inc.; AppleLink 6.1 User's Guide Update; 1991.
Apple Computer, Inc.; AppleLink Personal Edition Connect Guide; 1988; pp. 1-38.
Apple Computer, Inc.; Developer's Handbook; 1984; pp. 1-32.
Apple Computer, Inc.; Getting Started With AppleLink 6.0; 1990; pp. 1-19.
Apple Computer, Inc.; Getting Started With AppleLink 6.1; 1991; pp. 1-21.
Apple Computer, Inc.; Gorillas in the Disc, Apple Developer Group, Developer CD Series vol. VI; 1991; pp. 3-15.
Apple Computer, Inc.; HyperCard Basics; 1990; pp. 1-33.
Apple Computer, Inc.; HyperCard Information . . . It's All Over AppleLink!; AppleLink Ink; May 15, 1989.
Apple Computer, Inc.; Info Guide for AppleLink 6.0; 1990.
Apple Computer, Inc.; Info Guide for AppleLink 6.1; 1991.
Apple Computer, Inc.; Inside CCL: The AppleLink Communication Control Language Scripting Guide; 1990; pp. i-xiv, 1-312.
Apple Computer, Inc.; Macintosh AppleLink Apple Edition User's Guide AppleLink 6.0; 1990.
Apple Computer, Inc.; Outside Apple; May 1988.
Apple Computer, Inc.; Read Me First, AppleLink 6.1; 1992.
Apple Computer, Inc.; Software Dispatch Free CD and Advertisement. Identified in Appendix B of Defendants' P.R. 3-3 Invalidity Contentions in Disc Link v. H&R Case No. 5:06-CV-00295-DF dated Nov. 1, 2007.
Apple Computer, Inc.; Software Dispatch User's Guide; 1993; pp. 1-10.
Apple Computer, Inc.; The Apple CD-ROM Handbook; Addison-Wesley Publishing Company; 1992; pp. 1-144.
Apple Computer, Inc.; The Developer Handbook: A Reference Guide to Development Programs and Services for Apple Developers, Third Edition; Apr. 1991.
Apple Computer, Inc.; The Hexorcist CD—Developer CD Series; Oct. 1992.
Aragon; Pitching Products; PC Week; Aug. 1, 1994.
Bain; Pinpointing differences between Atlas Pro, MapInfo; MacWeek; vol. 6, No. 10; Mar. 9, 1992.
Barbara Quint; Compact Cambridge/Cambridge Information Group; Cambridge Scientific Abstracts; Database Searcher; vol. 8, No. 1; Jan. 1992; p. 20.
Barbara Quint; Footsore Searcher Tours Online/CD-ROM '91 Exhibits: "Day Three"; Database Searcher; vol. 8, No. 2, Feb. 1992; p. 10.

Barr; Buy? hold? sell? MarketArts Windows on Wall street; PC Magazine; vol. 13, No. 11; Jun. 14, 1994.
Barret; Sampling the Content; Seybold Report on Desktop Publishing; vol. 8, No. 8; Seybold Publication; 1996.
Berners-Lee, Weaving The Web: The Original Design and Ultimate Destiny of the World Wide Web By Its Inventor; 1999; pp. 22-23, 28-31, 45-51.
Berners-Lee, Weaving The Web: The Original Design and Ultimate Destiny of the World Wide Web By Its Inventor; 1999; pp. 4-6, 13-23, 56, 64.
Bond; Banks hope their customers plug in to on-line billpaying; The Dallas Morning News; Sep. 18, 1994.
Borgstrom et al.; WilsonDisc's MLA on CD-ROM; CD-ROM Professional; vol. 3, No. 5; Sep. 1990; pp. 64-68.
Braunagel; The natural: baseball and computers Programs cater to statistics lovers, fantasy leaguers, fans of all kinds; The San Diego Union-Tribune; Apr. 12, 1994.
Brian Weinert; CD-ROM Technology. Past, Future; Jan. 23, 2002.
Bryant; Combining Online and Disc; Online & CDROM Review; vol. 17, No. 6; Dec. 1993.
Burr; Field of Screens; Entertainment Weekly; No. 235; Aug. 12, 1994.
Burrill; You can be the manager with these baseball games; The Toronto Star; Aug. 31, 1991; LIFE section; p. 4F.
C. Brown; Net 286 Gazette Online Magazine; Sep. 25, 1993.
CD Publishing Corporation; CD Publishing Spec Sheet: Packet Driver CD: The Crynwr library!
CD Publishing Corporation; Facsimile from Mark Frass to Nancy Gauthier, Americ Disc with Purchase Order; Dec. 20, 1993.
CD Publishing Corporation; Invoice No. 1000015 to Doug Veldbuisea; Jan. 9, 1994.
CD Publishing Corporation; Invoice No. 1000016 to Richard Smith; Jan. 9, 1994.
CD Publishing Corporation; Invoice No. 1000019 to Wolfgang Fahl; Jan. 9, 1994.
CD Publishing Corporation; Invoice No. 1000020 to Tim Evans; Jan. 9, 1994.
CD Publishing Corporation; Invoice No. 1000096 to Bernd Sommerfeld; Mar. 28, 1994.
CD Publishing Corporation; Invoice No. 1000129 to Anthony Sanders; Jun. 15, 1994.
CD Publishing Corporation; Invoice No. 1000129 to Gary Seabridge; Jun. 15, 1994.
CD Publishing Corporation; Invoice No. 1000133 to Bernd Sommerfeld; Jun. 19, 1994.
CD Publishing Corporation; Invoice No. 1000134 to Hans-Günther Willers; Jun. 25, 1994.
CD Publishing Corporation; Invoice No. 1000135 to Bernd Sommerfeld; Jun. 19, 1994.
CD Publishing Corporation; Invoice No. 1000137 to Sang Shin; Jun. 30, 1994.
CD-ROM With Baseball Daily Online to Hit Stores as Microsoft Home's First Complete Sports Software; Comprehensive, Multimedia Guide to America's Favorite Pastime Is an Official Publication of Major League Baseball; Business Wire; Jun. 10, 1994.
Charles Bermant; Enhanced CD's Promise to Redefine Liner Notes; Feb. 20, 2002.
Christopher Barr; On-line to Tomorrowland; PC Magazine; Jan. 25, 1994; p. 30.
Clay Andres; Authoring Tools Help Developers Deliver Multimedia Message on CD; Dec. 6, 1993.
Commerce Clearing House, Inc.; Access CD-Rom Extend Quick Reference; 1993.
Commerce Clearing House, Inc.; Access Tax Research Series, CCH Access CD-ROM User Guide; 1993.
Complete Baseball Editorial Coverage listing (1994).
Complete Baseball Materials Including Editorial Coverage; New York Times; Jun. 27, 1994.
CompuServe Inc.; CompuServ Introductory Membership; 1993; pp. 1-31.
CompuServe Inc.; CompuServe CD; CompuServe CD goes to Extremes; Issue #495W Windows Edition; 1995.
CompuServe Inc.; CompuServe CD; Multimedia Comes to CompuServe, MIDI Music Issue; Issue #194W Windows Edition; Jul./Aug. 1994.
CompuServe Inc.; CompuServe CD; Multimedia Comes to CompuServe; Pilot Issue #094 W Windows Edition; May 1994.
CompuServe Inc.; CompuServe IntroPak; 1986; pp. 1-44.
CompuServe Inc.; Dear Reader, Article "Introducing CompuServeCD" and advertisement "We've added a new curve to the information highway"; CompuServe Magazine; Jul. 1994; p. 16.
CompuServe Inc.; Dear Reader; CompuServe Magazine; May 1994; p. 3.
CompuServe Inc.; Screen Shots of "What's New"; Jan. 21, 1994.
CompuServe Incorporated and Metatec Corporation Announce Strategic Alliance; PR Newswire; Sep. 20, 1993.
Connect with Nautilus CD; Jun. 1994.
Cooper; About Face: The Essentials of User Interface Design; IDG Books Worldwide, Inc.; 1995; pp. 229-246.
Corr; Microsoft is expanding retail markets; The Seattle Times; Jun. 6, 1994.
Cricket Liu, et al.; Managing Internet Information Services; O'Reilly & Associates, Inc.; Dec. 1994.
Database Management; Software Review; Software for Apple Macintosh Computers, Evaluation, MacUser; vol. 8, No. 13; Jan. 1993.
David Guenette; I've Got a Line On a Secret; CD-ROM and Online Technologies Merging to Create Hybrid Format; Information Access Company, ASAP, Pemberton Press Inc.; Jul. 1, 1995.
David Raggett; HTML (Hypertext Markup Language); WWW Discussion Group Request for Comments; Jul. 12, 1993.
David Raggett; HTML+(Hypertext Markup Language); WWW Discussion Group Request for Comments; Jul. 12, 1993; pp. 1-31.
Dialog Corp.; Dialog on Disc; and related demonstrations; Jan. 1993.
Dialog Corp.; Dialog OnDisc. And related documentation; Jan. 1992.
Dialog Information Services, Inc.; Dialog OnDisc User's Guide, Version 4.0 for DOS; Jul. 1993.
DISCC (Compact Disc). Identified in Appendix B of Defendants' P.R. 3-3 Invalidity Contentions in Disc Link v. H&R Case No. 5:06-CV-00295-DF dated Nov. 1, 2007.
Dunphy; The Seattle Times; Mar. 3, 1994.
E-Mail from be@stardiv.de to info@CDPublishing.com; Nov. 30, 1993.
E-Mail from davids@cofemz.gov.ar to info@CDPublishing.com; Dec. 8, 1993.
E-Mail from fahl@sesq1.dwh1.de to info@CDPublishing.com; Dec. 2, 1993.
E-Mail from info@CDPublishing.com to JeffR@nova.cd.com; Jan. 26, 1994.
E-Mail from Man McLennan to info@CDPublishing.com; Nov. 22, 1993.
E-Mail from NEgaard@Jayne.Graceland.edu to skl@connectivity.com; Dec. 13, 1993.
E-Mail from Peter W. D. Broadbent to info@CDPublishing.com; Dec. 10, 1993.
E-Mail from Robert A. Bruce to Newsgroup comp.newprod re Internet Info CDROM—FAWx, RFCs, docs, etc.; Apr. 5, 1994.
E-Mail from Robert Bruce to Lillian C. Henry re Free BSD/Internet Info; Sep. 3, 2003.
E-mail from Robert Bruce to Michelle M. Umberger re Free BSD/InternetInfo; Sep. 3, 2003.
E-Mail from Russell Nelson to Samuel Lam re Decision Needed; Sep. 26, 1993.
E-Mail from Stan Taylor to info@CDPublishing.com; Nov. 30, 1993.
E-Mail from Uenal_Mutlu@rci.fido.de; Nov. 29, 1993.
E-Mail from usinet!brooks@uunet.uu.net to info@CDPublishing.com; Nov. 23, 1993.
E-Mails from Russell Nelson; 1994.
E-Mail from Samuel Lam to Mark Frass re Russ Nelson's Story; Jun. 1, 1994.
Eis; Directory of Law-Related CD-ROMs; Infosources Publishing; 1994; pp. 1-171.
Enbyst; Banking at home: New software gives access via computer; Journal Am; Feb. 11, 1994.

Engst et al; Internet Explorer Kit for Macintosh; Hayden Books; 1994; pp. i-xvi, 1-446.

Engst; The Internet Starter Kit for Macintosh, Second Edition; Hayden Books; 1994; pp. I-XXVIII, 1-990.

Falkner; Secrets to Success; The Sporting News; Jun. 27, 1994.

File Folder-PR 125 A112 Apple Computer Inc.—Letter and Encrypted Software Distribution and Vending Agreement. Identified in Appendix B of Defendants' P.R. 3-3 Invalidity Contentions in *Disc Link* v. *H&R* Case No. 5:06-CV-00295-DF dated Nov. 1, 2007.

File History for U.S. Appl. No. 08/224,280, filed Apr. 7, 1994 entitled Efficient Cryptographic Methods and Devices.

File History for U.S. Appl. No. 08/279,424, filed Jul. 25, 1994 entitled Information Distribution System.

File History for U.S. Appl. No. 08/644,838, filed May 10, 1996 entitled Information Distribution and Processing System.

File History for U.S. Patent No. 5,467,255, U.S. Appl. No. 08/225,649, filed Jun. 8, 1994 entitled Information Distribution and Processing System.

File History for U.S. Patent No. 6,021,307, U.S. Appl. No. 08/939,368, filed Sep. 29, 1997 entitled Information Distribution and Processing System.

File History for U.S. Patent No. 6,314,574, U.S. Appl. No. 09/188,157, filed Nov. 8, 1998 entitled Information Distribution System.

Fisher et al.; Riding the Internet Highway, Deluxe Edition; New Riders Publishing; 1994; pp. i-xv, 1-381.

Flynn; There's no place like home: Microsoft's Patty Stonesifer creates hot CD-ROMs for families; U.S. News & World Report; Apr. 25, 1994.

Fraase; The PC Internet Tour Guide: Cruising the Internet the Easy Way; Ventana Press; 1994; pp. i-xxiv, 1-284.

FT adds features, loses manager; Information World Review, No. 84; Sep. 1993.

Gail L. Bower; CD-Rom. EDI, and pas: Power-com-2000; Jul.-Aug. 1994.

Gary Baker; The Mac Internet Tour Guide; Jan. 1994.

Gautier, et al; Automatic Program Recording System; Radiodiff et TV; Nov. 1975.

Gelmis; '90s Film School; Newsday; Jun. 17, 1994.

Genigraphics Corporation; Genigraphics Frames of Reference; 1990.

Genigraphics Corporation; Genigraphics Service Card; 1988.

Genigraphics Corporation; Genigraphics The Worry-Free Solution for Dazzling Presentations; 1989.

Getting Multimedia From a Kit; May 1993.

Global Village Communication, Inc.; GlobalFax User's Guide; 1995.

Global Village Communication; Global Village Communication PowerPort Series User's Guide; 1992.

Godin; Point & Click Internet, Macintosh Edition; Peachpit Press, Inc.; 1994; pp. 1-103.

Goldfarb; The SGML Handbook; 1990.

Google NewsGroup from info@CDPublishing.com to comp. newprod re New DOS/Windows TCP/IP CD-ROM (Packet Driver, WinSock & TCP/IP); Feb. 15, 1994.

Gord Nickerson; Mining for Gold; Jan. 1994.

Gordon Nickerson; WorldWideWeb; Computers in Libraries; vol. 12, No. 11; Dec. 1992; p. 75.

Graham W. Robinson ; RFC1436 (gopher); CD Publishing Corporation; Mar. 1993.

Griffith; The Federal Register on CD-ROM; Information Today; vol. 9; No. 11; Dec. 1992; pp. 32-34.

Guenette; The CD-ROM; CD-ROM Professional; Mar. 1996.

Gunnar Liestol; Hypermedia Communication and Academic Discourse: Some Speculations on a Future Genre, 1993; 1993.

Handwritten notes by Russell Nelson; Dec. 1, 1993.

Hara Yoshiko; Consortium Eyes Satellite-Based-E-Book System; Electronic Engineering Times; Oct. 1998.

Hiestand; Around NewYork, stadiums plan to double as theme parks; USA Today; May 10, 1994.

Houghton Mifflin Company; The American Heritage Collection Dictionary, Third Edition; 1993; p. 3.

How money programs compare; SJM News; Oct. 9, 1994; p. E4.

IBM Corp; Link Class Hierarchy Design; IBM Technical Disclosure Bulletin; vol. 34, No. 9; Feb. 1992; pp. 166-167.

IBM; Automatic Hypermedia Link Generation; IBM Technical Disclosure Bulletin; vol. 35, No. 1a; Jun. 1992.

IBM; Fully-Digital GML-Based Authoring and Delivery System for Hypermedia; IBM Technical Disclosure Bulletin; vol. 35, No. 2; Jul. 1992.

IBM; Local Area Network Program Distribution Facility; IBM Technical Disclosure Bulletin; vol. 33, No. 5; (Oct. 1990).

IEEE Inc.; The New IEEE Standard Dictionary of Electrical and Electronic Terms, Fifth Edition; 1993; 147, 304, 369, 726-727.

Information Today; Feb. 1988.

Intuit Inc.; Advertisement and related material, Quicken for Windows CD-ROM Deluxe Edition related material; 1993.

Intuit Inc.; Quicken for Windows CD-ROM Deluxe Edition related material; 1993.

Intuit Prospectus for 1,500,000 Shares Common Stock; Feb. 3, 1993.

Jakob Nielsen; Hypertext and Hypermedia; 1993.

James Kobielus; Look Before Leaping Into—Internet Electronic Commerce; Network World; Feb. 28, 1994; p. 32.

James Powell; Adventures with the World Wide Web: Creating a Hypertext Library Information System; DATABASE; vol. 17, No. 1; Feb. 1994; p. 59.

Jasco; CompuServe does CD-ROM; Information Today; vol. 11, No. 9; Oct. 1994.

Jim Louderback; One man's mission: a CD ROM Drive in Every PC; PC Week; vol. 9, No. 22; Jun. 1992; p. 70.

John P. Hayes; Computer Architecture and Organization; Jan. 1988; pp. 398-421.

Karl Beiser; What a difference a year makes: CD-ROM developments; Online; vol. 17, No. 3; May 1993; p. 109.

Kasten; Microsoft Corporation, Industry Announcements, From the Intermedia 94 Conference, Mar. 1-3, San Jose, CA; Multimedia Monitor; vol. XII, No. 4; Apr. 1994.

Kathryn Nesbit; BRS/Links to the Future: Online Hypertext is Born; May 1990.

Kazman; Structuring the Text of the Oxford English Dictionary through Finite State Transduction; Jun. 1986; pp. i-viii, 1-117.

Keizer; Digital Dollars & Silicon Cents; PC Magazine; Jan. 25, 1994.

Keizer; MECA's Managing Your Money breaks into the Windows market; PC Magazine; vol. 13, No. 12; Jun. 28, 1994; p. 37.

Keizer; Money matters: PC Personal-Finance Packages; Computer Shopper; Aug. 1994; pp. 522-526, 528, 82.

Kevin Moran; Internal WGL/RIA memorandum re "Feb. 1993 Monthly Operating Report, Product Development & Production"; Feb. 22, 1993.

Keyboards dream teams; USA Today; Aug. 30, 1991.

Kim; Interactive Attractions: Or how to play sports games with your computer—a primer for technotyros; Sports Illustrated; Jun. 27, 1994.

Kime H. Smith, Jr.; Accessing Multimedia Network Services; May 1992.

Kristof; Breathing new life into home banking: Computer, TV and phone hookups are new ways of visiting the teller's window; Chicago Tribune; Jan. 4, 1994.

Landis et al.; Baseball Daily; USA Today; Jun. 9, 1994.

Landis; With CD-ROM, books speak volumes; USA Today; Mar. 3, 1994.

Laura Fillmore; Internet Publishing: How We Must Think; Dec. 7, 1993.

Laurie Flynn; CD-ROMs: They're Not Just for Entertainment; Apr. 24, 1994.

Letter from JF Lehmanns Med Buchhandlung GmBH to CD Publishing Corporation re: invoice settlement; Jul. 21, 1994.

Lewis; In Cyberspace, a High-Tech League of Their Own; The New York Times; Apr. 5, 1994.

Lewis; Technology for baseball fans creating a big league market; The Houston Chronicle; Apr. 10, 1994.

Library for Psychiatrists: American Psychiatric Press Inc.'s CD-ROM Library; Information Today; vol. 10, No. 6; Jun. 1993; p. 30.

Lichty; America Online's Internet, Windows Edition; Ventana Press; 1994; pp. i-xxxiv, 1-272.

Lietzke; On-Line information goes off-line, too; The Columbus Dispatch; Jun. 3, 1994.
Longley et al; Van Nostrand Reinhold Dictionary of Information Technology, Third Edition; (1969) pp. 424 and 502.
Macroeconomic Equity System; Wall Street & Technology; vol. 11, No. 11. Identified in Appendix B of Defendants' P.R. 3-3 Invalidity Contentions in *Disc Link* v. *H&R* Case No. 5:06-CV-00295-DF dated Nov. 1, 2007.
Mallory; Microsoft's Complete Baseball Will Download Stats; Newsbytes News Network; Mar. 22, 1994.
Manes; New Baseball Disk: Hits and Errors; The New York Times; Jun. 7, 1994.
Mann; Quicken 3 for Windows; Compute!; vol. 16, No. 4; Apr. 1994.
Marc Andreessen; New X-based Information Systems Browser Available; Feb. 16, 1993.
Marcus; Wilson Business Abstracts on CD-ROM for the corporate library; Database; vol. 17, No. 3; Jun. 1994.
Market House Books Ltd.; Dictionary of Computing, Third Edition; Oxford University Press; 1990; pp. 110-111.
Mary Ann O'Connor; Markup, SGML, and Hypertext for Full-Text Databases—Part III; Nov. 1992.
Mascha et al; Interactive Education Transitioning CD-ROMs to the Web; Prepared for WWW94 The First International Conference on the World Wide Web; May 25-27, 1994, CERN, Geneva.
Mazur et al.; Joining Digital Hypermedia and Networking for Collaboration In Engineering Design: A Project's Early Consideration; Mar. 1992.
McCullough; The Sports Locker; Computer Games Strategy Plus; Issue 20; Jul. 1992; pp. 64-67.
McCullough; Two's Company: The column for the well connected; Computer Games Strategy Plus; Issue 33; Aug. 1993.
McGraw-Hill Inc.; IBM Dictionary of Computing; 1994; 121, 165, 167, 517, 557, 651, and 667.
McManus; CD-ROM, Online Hybrids: Compuserve's CompuServe CD; Digital Media; vol. 4, No. 3; Aug. 8, 1994.
Memorandum from M. Horton, AT&T Bell Laboratories and R. Adams, Center for Seismic Studies; Standard for Interchange of USENET Messages; Dec. 1987; pp. 1-19.
Metatec Corporation; "NautilusCD" listing Multimedia Magazine personnel and providing subscription information; 1993.
Metatec Corporation; Metatec's NautilusCD Backpac vol. 6, Macintosh Edition (Issues 4-7 through 4-12); 1990, 1991, 1992, 1993, 1994.
Metatec Corporation; Metatec's Nautilus CD; 1995.
Meyer, The 'On-Line' War Heats Up; Newsweek; Mar. 28, 1994.
Meyer; On-Line Drive; Information Week; Mar. 28, 1994.
Meyerson; Up-to-the-Minute Baseball News; Electronic Entertainment; Jun. 1994.
Microsoft aims at baseball market; United Press International; Jun. 10, 1994.
Microsoft Continues Home Momentum With Nine New Products; Showcases New Products and Previews First Online Enhancement to CD-ROM Product; Business Wire; Mar. 1, 1994.
Microsoft Corporation; Advertisement "Transform your Home Computer with the Microsoft Home Collection" for Microsoft Bookshelf 94, Microsoft Money 3.0, Microsoft Works for Windows 3.0, and Microsoft Works for Macintosh 4.0; 1994.
Microsoft Corporation; Advertisement for Microsoft Complete Baseball "Turn your computer into a baseball Hall of Fame", Microsoft Home; 1994.
Microsoft Corporation; Advertisement for Microsoft Complete Baseball "We're holding tryouts for Microsoft Complete Baseball", Microsoft Home (Chicago Cubs); May 3, 1994.
Microsoft Corporation; Advertisement for Microsoft Complete Baseball "We're holding tryouts for Microsoft Complete Baseball", Microsoft Home (Mariners); 1994.
Microsoft Corporation; Baseball Daily Complementary Account; 1994.
Microsoft Corporation; Explore the Microsoft World of Sports and Games (1994).
Microsoft Corporation; Microsoft Advertisement for Microsoft Complete Baseball, Microsoft Home 1994 Edition (with Phillies and Blue Jays); 1994.

Microsoft Corporation; Microsoft CD-Rom Yearbook: 1989-1990; pp. 163-170; 1990.
Microsoft Corporation; Microsoft Complete Baseball (Complete Baseball) and related documentation; May 1994.
Microsoft Corporation; Microsoft Complete Baseball 1994 Edition Overview of Product; In-store availability Jun. 1994; 1994.
Microsoft Corporation; Microsoft Complete Baseball CD, 1994 Edition, including CD case insert, Microsoft License Agreement for Microsoft Complete Baseball 1994 for Windows on CDROM; Microsoft Baseball Daily information, and product registration cards; 1994.
Microsoft Corporation; Microsoft Complete Baseball CD-ROM With Baseball Daily Online to Hit Stores as Microsoft Home's First Complete Sports Software; Microsoft News Release; Jun. 10, 1994.
Microsoft Corporation; Microsoft Complete Baseball Spring Training Manual 1994 Edition; 1994.
Microsoft Corporation; Microsoft Money Training Version 3.0 Windows Setting Instructor's Guide; 1991-1994.
Microsoft Corporation; Microsoft Office Standard, Version 4.2; 1994.
Microsoft Corporation; Microsoft PowerPoint: Using PowerPoint and Genigraphics Desktop Presentation Services; 1988.
Microsoft Corporation; The Microsoft Home Software Catalog, Microsoft Home; Summer 1994.
Microsoft Has 9 New Products; Newsbytes News Network; Mar. 4, 1994.
Microsoft Press Computer Dictionary, Second Edition: The Comprehensive Standard for Business, School, Library, and Home; 1994; pp. 70, 88, 105, 356.
Microsoft Press Computer Dictionary, Second Edition: The Comprehensive Standard for Business, School, Library, and Home; 1994; p. 353.
Mitzman; Play ball; Eastsideweek; Mar. 23, 1994.
Money 3.0 Various Documents; Identified in Appendix B of Defendants' P.R. 3-3 Invalidity Contentions in *Disc Link* v. *H&R* Case No. 5:06-CV-00295-DF dated Nov. 1, 2007.
Mossberg; Baseball, Computers Team Up to Score With Stats Software; The Wall Street Journal; Apr. 28, 1994.
MPG-Net, Inc; Advertisement for MPG-NET "A Whole New Dimension in Entertainment"; Computer Games Strategy Plus; No. 39; Feb. 1994.
Multimedia Direct; CompuServeCD; Identified in Appendix B of Defendants' P.R. 3-3 Invalidity Contentions in *Disc Link* v. *H&R* Case No. 5:06-CV-00295-DF dated Nov. 1, 2007.
Nelson; Literary Machines, Edition 87.1; 1980.
New CompuServe CD ROM Brings the Power of Multimedia to Online Computing; CompuServe News Release; Jun. 1, 1994.
Newsbytes Daily Summary; Newsbytes News Network; Mar. 22, 1994.
Nielsen; Multimedia and Hypertext: The Internet and Beyond; Academic Press, Inc.; 1995; pp. 150-151.
Noam Chomsky; Online or Ondisc? When to Choose CD-ROM for your Database; Mar. 1993.
Nunn-Price; The Link between CD-ROM and Online; Law Technology Journal; vol. 2, No. 2; May 1993.
Ogawa et al.; Design Strategies for Scenario-based Hypermedia: Description of its Structure, Dynamics, and Style; Nov. 30-Dec. 4, 1992.
Online banking popular; Journal Am; Jun. 30, 1994.
Packet Driver Applications; CD Publishing Corporation; 1991.
Packet.h. (Compact Disc); Identified in Appendix B of Defendants' P.R. 3-3 Invalidity Contentions in *Disc Link* v. *H&R* Case No. 5:06-CV-00295-DF dated Nov. 1, 2007.
Parkinson; Nautilus CD adds magazine-like interface; Metatec Corp. introduces NautilusCD electronic magazine; MacWeek; vol. 7, No. 41; Oct. 18, 1993; p. 12.
Patrick Marshall; Multimedia Software: Microsoft Knows Multimedia and Flaunts it with Encarta CD-ROM; Info-World; Apr. 9, 1993; p. 113.
Paul Nicholls; Assessing CD ROM in Canada; CD-ROM World; vol. 8, No. 5; Jun. 1993; p. 38.
Peter Jasco; Online Updates Keep CD-ROM Current; Information Access Company, ASAP, Information Today, Inc.; Nov. 1, 1995.

Premise Software User; West Publishing Co.; 1989.
Prodigy Services Company; "Get Started Now" set up and installation of disk instructions re Prodigy Interactive Personal Service. Identified in Appendix B of Defendants' P.R. 3-3 Invalidity Contentions in *Disc Link* v. *H&R* Case No. 5:06-CV-00295-DF dated Nov. 1, 2007.
Prodigy Services Company; Prodigy Interactive Personal Service Start-up Kit; 1991.
Prodigy Services Company; Prodigy Interactive Personal Service Start-up Kit Phone Book; Aug. 30, 1991.
Prodigy Services Company; The Handbook for Prodigy Interactive Personal Service; 1990-91.
Random House, Inc.; Random House Unabridged Dictionary, Second Edition; 1993; pp. 1926 and 1958.
Raskin; Taxing Times; PC Magazine; Jan. 25, 1994.
Raymond et al.; Hypertext and the New Oxford English Dictionary; Hypertext '87 Papers; Nov. 1987 pp. 143-153.
Reality Technologies Inc.; Advertisement and related material, Reality's WealthBuilder 3.0 by Money Magazine, IBM Version; 1993.
Reality Technologies Inc.; User Guide, Reality's WealthBuilder 3.0 by Money Magazine, IBM Version; 1992; pp. 1-325.
Reality Technologies Inc.; WealthBuilder Version 3.1 Supplement, Reality's WealthBuilder 3.0 by Money Magazine, IBM Version; Apr. 1993; pp. 1s-3s, 59s-85s, 141s-229s, 255s-268s+, 301-308s, 315s-325s. Identified in Appendix B of Defendants' P.R. 3-3 Invalidity Contentions in *Disc Link* v. *H&R* Case No. 5:06-CV-00295-DF dated Nov. 1, 2007.
Registrar of Companies, British Columbia, Canada; Company Act for CD Publishing Corporation with Certificate of Change of Name dated Mar. 4, 1993, Certificate of Incorporation dated Dec. 18, 1987 and Articles; Aug. 28, 2002.
Reisman; CD-ROM/Online Hybrids The Missing Link?; CD-ROM Professional; vol. 8, No. 4; Apr. 1995.
Research Institute of America Inc.; OnPoint for Novell Network; 1994.
Reviews/Products Comparison; InfoWorld; Dec. 7, 1992; p. 86 (24 sheets).
Richard Danca; MapBox Marries CD-ROM, Satellite Positioning; Federal Computer Week; Apr. 29, 1991.
Riger et al.; The Challenge of CD-ROM Technology to Online Databases in Law Firm Libraries: An Overview of the Rise and Current Troubles Facing Legal Databases; 14th National Online Meeting Proceedings; 1993; pp. 349-354.
Rink; Earl Weaver Baseball II; Software Review; one of four baseball simulation games reviews in '386 Down the Power Alleys'; PC Magazine; vol. 11, No. 8; Apr. 28, 1992.
Robert Rubenstein and William Wasserman; CD-ROM Update: Tax Information of CD-ROM; The Tax Adviser; vo. 24, No. 1; Jan. 1993; p. 59.
Ropiequet et al.; CD ROM Optical Publishing; vol. 2; Microsoft Press; 1987; Chapter 5; pp. 63-82.
S&P and Dialog introduce company information on CD-ROM; Standard & Poor's Corp., CD-ROM Disc; Information Today; vol. 5, No. 6; Jun. 1998; p. 22.
S. Deering; Host Extensions for IP Multicasting; Network Working Group, Request for Comments: 1112; Aug. 1989.
Salamone; Electronic Software Distribution: Diamond in the Rough; Data Communications; Mar. 1993; pp. 109-116.
Schlosberg; The Joys of Summer; HomePC; Aug. 1994.
Scisco; Pigskin preview; computer football games; Compute!; vol. 14, No. 8; Sep. 1992.
Sengstack; The Sporting Life; CD-ROM World; Jul./Aug. 1994.
Sherman et al.; Exploring Hybrid World of CD-ROM/On-Line Products: Microsoft, America On Line and Others Look to Offer Solutions; Multimedia Week; vol. 3, No. 10; Mar. 7, 1994; pp. 1-8.
Simon & Schuster Inc.; Webster's New World Dictionary of Computer Terms, Fourth Edition; Prentice Hall; 1992; pp. 45, 95, 94, and 191.
Simon; Pipeline: Enter the Internet; PC Magazine; Feb. 8, 1994, p. 46.
Slay; Money Management Cures; MacWorld; Mar. 1991; pp. 152-158.
Smith et al.; Navigating the Internet, Deluxe Edition; Sams Publishing; 1994; pp. i-xxvii, 1-640.
Sportswire; Computer Games Strategy Plus; No. 44; Jul. 1994.
Stangenes; 'First' teams up with Microsoft on home banking; Chicago Tribune; Nov. 19, 1993.
Steinberg; GeoQuery: GeoQuery's mapping tool gains tighter links to spreadsheet and database programs; MacUser; vol. 8, No. 10; Oct. 1992.
Stephen Nathans; The CD/Online Enablers: Vendors and Services Taking the Hybrid Lead; Information Access Company, ASAP, Pemberton Press Inc.; Mar. 1996.
Steven Newcomb, Neill Kipp, and Victoria Newcomb; The 'HyTime' Hypermedia/Time-based Document Structuring Language; Communications of the ACM; vol. 34, No. 11; Nov. 1991; p. 67.
Stonebraker; The INGRES Papers: Anatomy of a Relational Database System; 1986.
Sugawara; Microsoft's Very Big Ballpark Estimate; Software Giant's 'Complete Baseball' Opens a Window on Its Ambitious On-Line Plans; The Washington Post; May 7, 1994.
Summer CES; Computer Games Strategy Plus; Issue 22; Sep. 1992.
Sun Microsystems; Solaris Infoware 2: Internet Edition; 1994.
Swenson; Banking through home computer has arrived; Journal Am; May 23, 1994.
Swenson; New software aimed at kids, baseball fans; Journal American; Mar. 2, 1994.
Swenson; Software you can bank on: Microsoft, U.S. Bank to put financial services within modems' reach; Journal Am; Dec. 7, 1993.
Symantec; Scenarios 1-6 and SAM Screen Captives. Identified in Appendix B of Defendants' P.R. 3-3 Invalidity Contentions in *Disc Link* v. *H&R* Case No. 5:06-CV-00295-DF dated Nov. 1, 2007.
Symantec; Symantec Antivirus for Macintosh 4.0 and related documentation (SAM 4.0). Identified in Appendix B of Defendants' P.R. 3-3 Invalidity Contentions in *Disc Link* v. *H&R* Case No. 5:06-CV-00295-DF dated Nov. 1, 2007.
Symantec; Symantec's SAM Manual; 1994.
Szymonik; World at War: Operation Crusader; Computer Games Strategy Plus; No. 41; Apr. 1994; pp. 38-39.
Taylor et al.; 'Intermedia' Shows a Maturing Multimedia Industry; Publishers Weekly; Mar. 21, 1994.
Teleshuttle Corp.; Resource Guide on Distributed Media: Local / CD-ROM / Online / Web; 1996-7.
The Public Access Computer Systems Review; University Libraries. University of Houston; 1994.
Theodor Holm Nelson; Literary Machines 90.1; 1990.
Thomas Pack; Greater than the Sum of their Parts: CD-ROM/Online Hybrids; Online Inc.; Mar. 1996.
Thro; The Database Dictionary; Microtrend Books; 1990; p. 68.
Tom Speyer; Memorandum re "Interface between CD ROM and TaxRIA/AccessPlus"; Jul. 15, 1992.
Transcript of Deposition of Hark Chan in *Chan et al.* v. *Intuit et al.*, N.D. Cal. Case No. C 02-2878 (VRW); May 2, 2003; pp. 1-3 (Index).
Transcript of Deposition of Heinz Lycklama, Ph.D. in *Chan et al.* v. *Intuit et al.*, N.D. Cal. Case No. C 02-2878 (VRW); May 23, 2003; pp. 1-150.
Transcript of Deposition of Robert Bruce in *Chan et al.* v. *Intuit et al.*, N.D. Cal. Case No. C 02-2878 (VRW); Sep. 3, 2003; pp. 1-216.
Transcript of Videotaped Deposition of Douglas Branstetter in *Chan et al.* v. *Intuit et al.*, N.D. Cal. Case No. C 02-2878 (VRW); Aug. 6, 2003; pp. 1-258.
Transcript of Videotaped Examination Before Trial of Russell Neil Nelson in *Chan et al.* v. *Intuit et al.*, N.D. Cal. Case No. C 02-2878 (VRW); Aug. 22, 2003; pp. 1-141.
Transcript Videotaped Examination Before Trial of Russell Neil Nelson in *Chan et al.* v. *Intuit et al.*, N.D. Cal. Case No. C 02-2878 (VRW); Aug. 22, 2003; pp. 1-141, 142-154.
USA: Microsoft has Baseball CD-ROM; Reuters News Service; Jun. 10, 1994.
Vaughn; Publishing on CD-ROM: The NautilusCD experience; CD-ROM Professional; vol. 7, No. 3; May/Jun. 1994; pp. 59-68.
Vogt; CD-ROM and online—competitors or compatriots? An online host's point of view; Online Information 92, 16th International Online Information Meeting Proceedings, London; Dec. 8-10, 1992; pp. 33-45.

Walnut Creek CDROM; FreeBSD 1.1, UNIX; May 1994.
Warner; Sports Computer Games: Several new football games out; The Atlanta Journal and Constitution; Nov. 17, 1991; SPORTS section F, p. 2.
Warner; Tax Services and Tax Forms on CD-ROM; The CPA Journal; Nov. 1993; pp. 48-52.
Wei; A Brief Overview of the VIOLA Engine, and its Applications; Identified in Appendix B of Defendants' P.R. 3-3 Invalidity Contentions in *Disc Link* v. *H&R* Case No. 5:06-CV-00295-DF dated Nov. 1, 2007.
West Premise; West. Identified in Appendix B of Defendants' P.R. 3-3 Invalidity Contentions in *Disc Link* v. *H&R* Case No. 5:06-CV-00295-DF dated Nov. 1, 2007.
West Publishing Co., Production Release Dates listing Premise releases 1988-1996; 1996.
West Publishing Co.; West Publishing CD-ROM Sales Calendar Year 1989-1993; 1993.
West Services Inc.; Letter to Premise Subscriber "Welcome to the Exciting New World of CD-ROM Research Using Premise 1.4!". Identified in Appendix B of Defendants' P.R. 3-3 Invalidity Contentions in *Disc Link* v. *H&R* Case No. 5:06-CV-00295-DF dated Nov. 1, 2007.
West Services Inc.; Making the Easy Transition to Premise 1.4! Premise 1.4 Highlights; 1991.
West Services Inc.; Premise Notebook; 1991.
West Services Inc.; Premise, Quick Reference Card; 1991.
West Services Inc.; Premise, User Manual, 2nd Edition; 1991; pp. 1-162.
West Services Inc.; Premise, User Manual; 1992; pp. 1-56.
West Services Inc.; Premise, User Packet; 1991.
West Services Inc.; QuickScan on Premise; 1991.
West Services Inc.; Reference Manual, Revised Edition; 1989; pp. 1-221 and Reference Manual, Addendum; 1990.
West Services Inc.; West's CD-ROM Communique, Special Issue; Spring 1991.
Wiggins; The University of Minnesota's Internet Gopher System: A Tool of Accessing Network-Based Electronic Information; The Public-Access Computer Systems Review; vol. 4; 1993; pp. 24-76.
WordPerfect Corporation; Online Technical Support Service. Identified in Appendix B of Defendants' P.R. 3-3 Invalidity Contentions in *Disc Link* v. *H&R* Case No. 5:06-CV-00295-DF dated Nov. 1, 2007.
WordPerfect Corporation; WordPerfect Version 6.0, Windows; 1993; pp. 5-6, 876-883.
Defendants' P.R. 3-3 Invalidity Contentions in *Disc Link* v. *H&R* Case No. 5:06-Cv-00295-DF and *Disc Link* v. *Oracle* Case No. 5:07-CV-58-DF; Nov. 1, 2007; pp. 1-26.
Identification of Prior Art; pp. 1-5; Exhibit A in Nov. 1, 2007 Defendants' P.R. 3-3 Invalidity Contentions in *Disc Link* v. *H&R* Case litigation.
Identification of Additional Prior Art; pp. 1-50; Exhibit B in Nov. 1, 2007 Defendants' P.R. 3-3 Invalidity Contentions in *Disc Link* v. *H&R* Case litigation.
Claim 17 v. CompuServe CD; Exhibit C in Nov. 1, 2007 Defendants' P.R. 3-3 Invalidity Contentions in *Disc Link* v. *H&R* Case litigation.
Claim 17 v. Prior Art: PC Gopher; Exhibit C in Nov. 1, 2007 Defendants' P.R. 3-3 Invalidity Contentions in *Disc Link* v. *H&R* Case litigation.
Claim 17 v. Quicken Companion CD; Exhibit C in Nov. 1, 2007 Defendants' P.R. 3-3 Invalidity Contentions in *Disc Link* v. *H&R* Case litigation.
Claim 17 v. PacketDriver, InfoMac, SunSoft CD/NCSA Mosaic; Exhibit C in Nov. 1, 2007 Defendants' P.R. 3-3 Invalidity Contentions in *Disc Link* v. *H&R* Case litigation.
Claim 17 v. Free BSD and SunSoft CD/Lynx; Exhibit C in Nov. 1, 2007 Defendants' P.R. 3-3 Invalidity Contentions in *Disc Link* v. *H&R* Case litigation.
Claim 17 v. Premise Prior Art; Exhibit C in Nov. 1, 2007 Defendants' P.R. 3-3 Invalidity Contentions in *Disc Link* v. *H&R* Case litigation.
Claim 17 v. RIA OnPoint Prior Art; Exhibit C in Nov. 1, 2007 Defendants' P.R. 3-3 Invalidity Contentions in *Disc Link* v. *H&R* Case litigation.
Claim 17 v. Baseball Prior Art; Exhibit C in Nov. 1, 2007 Defendants' P.R. 3-3 Invalidity Contentions in *Disc Link* v. *H&R* Case litigation.
Claim 17 v. Prior Art: AppleLink versions 6.0 / 6.1; Exhibit C in Nov. 1, 2007 Defendants' P.R. 3-3 Invalidity Contentions in *Disc Link* v. *H&R* Case litigation.
Claim 17 v. AOL 1.0; Exhibit C in Nov. 1, 2007 Defendants' P.R. 3-3 Invalidity Contentions in *Disc Link* v. *H&R* Case litigation.
Claim 17 v. NautilusCD; Exhibit C in Nov. 1, 2007 Defendants' P.R. 3-3 Invalidity Contentions in *Disc Link* v. *H&R* Case litigation.
Claim 17 v. Prior Art: U.S. Patent No. 5,761,649 (Hill); Exhibit C in Nov. 1, 2007 Defendants' P.R. 3-3 Invalidity Contentions in *Disc Link* v. *H&R* Case litigation.
Claim 17 v. Prior Art: U.S. Patent No. 5,555,407 (Cloutier); Exhibit C in Nov. 1, 2007 Defendants' P.R. 3-3 Invalidity Contentions in *Disc Link* v. *H&R* Case litigation.
Claim 17 v. Prior Art: Rich Wiggins, "The University of Minnesota's Internet Gopher System: A Tool for Accessing Network-Based Electronic Information." The Public-Access Computer Systems Review 4, No. 2 (1993) ; Exhibit C in Nov. 1, 2007 Defendants' P.R. 3-3 Invalidity Contentions in *Disc Link* v. *H&R* Case litigation.
Claim 17 v. Prior Art: Internet Engineering Task Force, "RFC1436: The Internet Gopher Protocol (a distributed document search and retrieval protocol)"; Exhibit C in Nov. 1, 2007 Defendants' P.R. 3-3 Invalidity Contentions in *Disc Link* v. *H&R* Case litigation.
Claim 17 v. Prior Art: U.S. Patent No. 5,694,546 (Reisman); Exhibit C in Nov. 1, 2007 Defendants' P.R. 3-3 Invalidity Contentions in *Disc Link* v. *H&R* Case litigation.
Claim 17 v. Prior Art: Darell R. Raymond and Frank Wm. Tompa, "Hypertext and the New Oxford English Dictionary," Hypertext '87 papers at 143-53, ACM 089791-340-X/89/0011/0153; Exhibit C in Nov. 1, 2007 Defendants' P.R. 3-3 Invalidity Contentions in *Disc Link* v. *H&R* Case litigation.
Claim 17 v. Reality Wealthbuilder; Exhibit C in Nov. 1, 2007 Defendants' P.R. 3-3 Invalidity Contentions in *Disc Link* v. *H&R* Case litigation.
Claim 17 v. Prior Art: Symantec's SAM 4.0 Manual; Exhibit C in Nov. 1, 2007 Defendants' P.R. 3-3 Invalidity Contentions in *Disc Link* v. *H&R* Case litigation.
Claim 17 v. Prior Art (U.S. Patent No. 5,157,783—Wang West); Exhibit C in Nov. 1, 2007 Defendants' P.R. 3-3 Invalidity Contentions in *Disc Link* v. *H&R* Case litigation.
Claim 17 v. Line Mode; Exhibit C in Nov. 1, 2007 Defendants' P.R. 3-3 Invalidity Contentions in *Disc Link* v. *H&R* Case litigation.
"Automatic Hypermedia Link Generation"; IBM Technical Disclosure Bulletin; vol. 35; No. 1A; pp. 447-448; Jun. 1992 (Joint 003687 to 003689).
"CD-Rom With Baseball Daily Online to Hit Stores as Microsoft Home's First Complete Sports Software; Comprehensive, Multimedia Guide to America's Favorite Pastime Is an Official Publication of Major League Baseball"; Business Wire; Jun. 10, 1994 (Joint 003665 to 003668).
"CompuServe Incorporated and Metatec Corporation Announce Strategic Alliance"; PR Newswire; Sep. 20, 1993 (Joint 003789 to 003790).
"CompuServe Releases CD"; Newsbytes; Jun. 3, 1994 (Joint 009893 to 009894).
"Connect with Nautilus CD"; Jun. 1994.
"Creating the Hypertext Cluster"; Mar. 21, 2002 (fourteen pages).
"Database Management"; MacUser; vol. 8; No. 13; p. 103; Jan. 1993 (Joint 003767 to 003772).
"Dialog OnDisc Links: CD-ROM and Online Providing a Complementary Service"; Library Micromation News; No. 24; pp. 11-16; Jun. 1989.
"First International Conference on the World-Wide Web"; May 25-27, 1994 (ten pages).
"FT adds features, loses manager"; Information World Review; No. 84; Sep. 1993 (Joint 003701 to 003703).
"Fully Digital GML based Authoring and Delivering System for Hypermedia"; IBM Technical Disclosure Bulletin; vol. 35; No. 2; pp. 458-463; Jul. 1992.
"Getting Multimedia From a Kit"; Smart Computing; vol. 4; issue 5; May 1993 (eight pages).
"History of Ovid Technologies"; Feb. 5, 2002 (three pages).
"How money programs compare"; SJM News, p. E4; Oct. 1994 (Joint 010810).

"Library for Psychiatrists; American Psychiatric Press Inc.'s CD-ROM Library"; Information Today; vol. 10; No. 6; p. 30; Jun. 1993 (two pages).
"Local Area Network Program Distribution Facility"; IBM Technical Disclosure Bulletin; vol. 33; No. 5; pp. 169-171; Oct. 1990 (Joint 003695 to 003698).
"Microsoft CD-ROM Yearbook: 1989-1990"; Microsoft; pp. 163-170; 1990 (Joint 5390 to 5400).
"Microsoft Continues Home Momentum With Nine New Products; Showcases New Products and Previews First Online enhancement to CD-ROM Product"; Business Wire; Mar. 1, 1994 (Joint 003660 to 003664).
"New CompuServe CD-ROM Brings the Power of Multimedia to Online Computing"; PR Newswire; Jun. 1, 1994 (Joint 009880 to 9884, 9891, and 9892).
"Online banking popular"; Journal American; Jun. 30, 1994 (Joint 010820).
"Reviews/Products Comparison"; InfoWorld; p. 86; Dec. 7, 1992 (JOINT003704 to 003727).
"S&P And Dialog Introduce Company Information On CD-ROM; Standard & Poor's Corp., CD-ROM Disc"; Information Today; vol. 5; No. 6; p. 22; Jun. 1988 (Joint 003699 to 003700).
"Web/CD-ROM Hybrids, A Working Definition"; Feb. 1, 2002 (five pages).
Alber, Antone; Videotex/Teletext, Principles and Practices; McGraw-Hill Book Company; ISBN 0-07-000957-0; 1985.
Andreessen, Marc; "New X-based Information Systems Browser Available"; Feb. 16, 1993 (two pages).
Andres, Clay; "Authoring Tools Help Developers Deliver Multimedia Message on CD"; Dec. 6, 1993 (four pages).
Apple Computer, Inc.; AppleLink 6.1 and related documentation; Jun. 1991 (Joint 001168 to 001767).
Apple Computer, Inc.; File Folder—PR 125 A112; Letter and Encrypted Software Distribution and Vending Agreement; (Joint 009184 to 009215).
Bain, G. Donald; "Pinpointing Differences between Atlas Pro, Map Info."; MacWeek, vol. 6; Mar. 9, p. 32; 1992 (Joint 003651 to 003652).
Baker, Gary; "The Mac Internet Tour Guide"; Jan. 1994 (three pages).
Barr, Christopher; "Buy? Hold? Sell? MarketArts Windows on Wall Street"; *PC Magazine*; vol. 13; No. 11; p. 30; Jun. 14, 1994 (Joint 003654 to 003655).
Barr, Christopher; "On-line to Tomorrowland"; *PC Magazine*; p. 30; Jan. 25, 1994 (Joint 003653).
Beiser, Karl; "What a difference a year makes: CD-ROM developments"; Online; vol. 17; No. 3; p. 109; May 1993 (six pages).
Bermant, Charles; "Enhanced CD's Promise to Redefine 'Liner Notes'"; New York Times; Dec. 11, 1994 (three pages).
Bond, Helen; "Banks hope their customers plug in to on-line bill paying"; The Dallas Morning News; Sep. 18, 1994 (Joint 010811).
Bower, Gail L.; "CD-Rom, EDI, and POS: Powercom-2000"; CD-ROM Professional; pp. 117-121; Jul./Aug. 1994.
Branstetter, Douglas; Deposition transcript and CDROM; Aug. 2003.
Brown, C.; "Net 286 Gazette Online Magazine"; No. 1.05; Sep. 25, 1993 (thirty-three pages).
Bryant, Gayle; "Combining Online and Disc"; Online & CD-ROM Review; vol. 17; No. 6; pp. 386-398; Dec. 1993 (Joint 003656 to 003659).
Burrill, William; "You Can Be the Manager with These Baseball Games"; Toronto Star, sec. Life; p. F4; (Earl Weaver Baseball) Aug. 31, 1991 (Joint 7898 to 7900).
CCH Access and related documentation and video; CCH, Inc.; 1993 (Joint 7758 to 7854; 7958).
CompuServe CD-ROM documents; 1994 (Joint 009898 to 009923).
CompuServe documents; Aug. 13, 2002 (Joint 009887 to 009888).
CompuServe Magazine; Jul. 1994 (Joint 010743 to 010747).
CompuServe Magazine; May 1994 (Joint 010748 to 010749).
CompuServe screenshots; Sep. 19, 2003 (Joint 011139 to 011145).
CompuServe; CompuServe CD (CCD) and related documentation; May 1994 (Joint 7880).

Deering, S.; "Host Extensions for IP Multicasting"; pp. 1-17; Aug. 1989; Network Working Group; Request for Comments: 1112 (sixteen pages).
Dialog Corp.; Dialog on Disc and related documentation; Jan. 1993; (Joint 7739 to 7751; 7876).
Enbysk, Monte; "Banking at home; New software gives access via computer"; Journal American; Feb. 11, 1994; (Joint 010822 to 010823).
File History of U.S. Patent No. 5,157,783 to Anderson et al.; issued Oct. 20, 1992 (West) (Joint 00143 to 00605).
File History of U.S. Patent No. 5,694,546 to Reisman, issued Dec. 2, 1997 (Reisman) (Joint 00606 to 00882).
Fillmore, Laura; "Internet Publishing: How We Must Think"; Dec. 7, 1993 (seven pages).
Flynn, Laurie; "CD-ROMs: They're Not Just for Entertainment"; New York Times; p. 10; Apr. 24, 1994.
Gautier et al.; "Automatic Program Recording System"; Radiodiff et TV; (w/translation) Nov. 1975 (twenty pages).
Gecsei, Jan; The Architecture of Videotex Systems; Prentice-Hall Inc.; ISBN 0130447765; 1983.
Germain, Joseph; "Citations from Engineering Index: EIX"; Jan. 28, 2002 (ten pages).
Gorillas in the Disc CD-ROM and Documentation; 1991 (Joint 009183; 009183.1 to 009183.10).
Griffith, Cary; "The Federal Register on CD-ROM"; Information Today; vol. 9; No. 11; pp. 32-34; Dec. 1992 (Joint 003682 to 003686).
Hara, Yoshiko; "Consortium Eyes Satellite-Based E-Book System"; Electronic Engineering Times; Oct. 1998 (two pages).
Hayes, John P.; "Computer Architecture and Organization"; pp. 398-421; Jan. 1988.
Jacso, Peter; "Compuserve does CD-ROM; Product Announcement"; Information Today; Oct. 1994 (Joint 009895 to 009897).
Keizer, Gregg; "Digital Dollars & Silicon Cents"; PC Magazine; pp. 235-244; Jan. 25, 1994 (Joint 003731 to 003736).
Keizer, Gregg; "MECA's Managing Your Money Breaks Into the Windows Market"; PC Magazine; vol. 13; No. 12; p. 37; Jun. 28, 1994 (Joint 003728 to 003730).
Keizer, Gregg; "Money Matters; PC Personal-Finance Packages"; Computer Shopper; Aug. 1994; (Joint 010813 to 010819).
Kobielus, James; "Look Before Leaping Into Internet Electronic Commerce"; Network World; p. 32; Feb. 28, 1994 (three pages).
Kristof, Kathy; "Breathing new life into home banking; Computer, TV and phone hookups are new ways of visiting the teller's window"; Chicago Tribune; Jan. 4, 1994 (Joint 010824).
Liestol, Gunnar; "Hypermedia Communication and Academic Discourse: Some Speculations on a Future Genre"; The Computer Medium; Cambridge Unv. Press; pp. 263-283; 1993.
Lietzke, Ron; "On-line information Goes Off-Line, Too"; Columbus Dispatch; Jun. 3, 1994 (Joint 009889 to 009890).
Liu Cricket et al.; "Managing Internet Information Services"; O'Reilly & Associates, Inc; pp. 279-298; Dec. 1994.
Louderback, Jim; "One man's mission: a CD ROM Drive in Every PC"; PC Week; vol. 9; No. 22; p. 70; Jun. 1992 (two pages).
Malnig, Anita; "Customers Build Their Own Mine Vehicles Via Multimedia"; MacWeek; vol. 7; No. 30; p. 42; Jul. 26, 1993 (two pages).
Mann, Richard; "Quicken 3 for Windows; Productivity Choice; Software Review; Evaluation"; Computel; vol. 16; No. 4; p. 76; Apr. 1994 (Joint 003773 to 003775).
Marcus, John; "Wilson Business Abstracts on CD-ROM for the Corporate Library"; *Database*; vol. 17; No. 3; pp. 52-55; Jun. 1994 (Joint 003776 to 003780).
Marshall, Patrick; "Multimedia Software; Microsoft Knows Multimedia and Flaunts it with Encarta CD-ROM"; InfoWorld; p. 113; Apr. 9, 1993 (two pages).
Mascha, Michael et al.; "Interactive Education: Transitioning CD-ROMs to the Web"; (Virtual Chimps); May 25-27, 1994.
Mascha, Michael; "Interactive Education: Transitioning CD-ROMs to the Web"; Computer Networks and ISDN Systems; vol. 27; No. 2; pp. 267-272; Nov. 1994.
Mazur et al.; "Joining Digital Hypermedia and Networking for Collaboration in Engineering Design: A Project's Early Consideration"; CD-ROM Professional; pp. 51-54; Mar. 1992.

McManus, Neil; "CD-ROM, online hybrids; compuServe's CompuServe CD"; Aug. 8, 1994 (Joint 009885 to 009886).

Microsoft; Microsoft Complete Baseball (Complete Baseball) and related documentation (with videos and CD disks); May 1994; (Joint 5027 to 5302; 5321 to 5389; 5401 to 5671; 6311 to 7519; 7540 to 7730; 7874, 7879, 7882 to 7895, 7953 to 7957).

Money 3.0 Various Documents; Apr. 15, 1993 (Joint 5001 to 5026; 5303 to 5320; 5672 to 6310).

Murray, Rink; "Earl Weaver Baseball II; Software Review; one of four baseball simulation games reviews in '386 Down the Power Alleys"; PC Magazine; vol. 11; No. 8; p. 493; Apr. 26, 1992 (Joint 7903 to 7904).

Nelson, Nancy; "Connectivity: Let Them Eat Cake"; Information today; vol. 5; Issue 2; Feb. 1988 (five pages).

Nelson, Russell N.; Deposition transcript and CDROM; Aug. 2003.

Nelson, Theodor Holm; "Literary Machines 90.1"; 1990 (three pages).

Nesbit, Kathryn; "BRS/Links to the Future: Online Hypertext is Born"; Online; vol. 14; No. 3; pp. 34-36; May 1990 (five pages).

Newcomb, Steven et al.; "The 'HyTime' Hypermedia/Time-based Document Structuring Language"; Communications of the ACM; vol. 34; No. 11; p. 67; Nov. 1991 (twenty-three pages).

Nicholls, Paul; "Assessing CD-ROM in Canada"; CD-ROM World; vol. 8; No. 5; p. 38; Jun. 1993 (eight pages).

Nickerson, Gord; "Mining for Gold"; CD-ROM Professional; pp. 128-132; Jan. 1994.

Nickerson, Gordon; "WorldWideWeb"; Computers in Libraries; vol. 12; No. 11; p. 75; Dec. 1992 (six pages).

Nielsen, Jakob; "Hypertext and Hypermedia"; 1993 (ten pages).

Nunn-Price, Norman; "The Link Between CD-ROM and Online"; Law Technology Journal; vol. 2; No. 2; at 13; (Justis Article); May 1993 (Joint 7855 to 7857).

O'Connor, Mary Ann; "Markup, SGML, and Hypertext for Full-Text Databases—Part III"; CD-ROM Professional; pp. 130-131; Nov. 1992.

Oben, Alta; "Review of Nautilus from May 1995 Monitor"; Jan. 14, 1994 (four pages).

Ogawa et al.; "Design Strategies for Scenario-based Hypermedia: Description of its Structure, Dynamics, and Style"; Proceeding of the ACM Conference on Hypertext; pp. 71-80; Nov. 30-Dec. 4, 1992 (eleven pages).

Packet Drivers CD (Packet Drivers or PCD) and related documentation; Jan. 1994 (Joint 7878).

Packet.h; Jul. 19, 1993 (Joint 003860 to 003891).

Parkinson, Kirsten L.; "Nautilus CD Adds Magazine-Like Interface; Product Announcement"; MacWeek; vol. 7; No. 41; p. 12; Oct. 18, 1993 (Joint 003787 to 03788).

Pei Wei; ViolaWWW and related documentation; May 1992; (PW 000001 to PW 001091; Joint 004180 to 004193).

Powell, James; Adventures with the World Wide Web: Creating a Hypertext Library Information System; Database; vol. 17; No. 1; pp. 59-66; Feb. 1994.

Premise; Making the Easy Transition to Premise 1.41; (Joint 009713 to 009718).

Premise Software; Version 1.2; 1989; (Joint 9723 to 9731).

Premise User Manual; 1991; (Joint 009240 to 009404).

Premise User Manual; 1992; (Joint 009405 to 009464).

Premise User Packet; Front and Back Cover; May 5, 1991; (Joint 009687 to 009688).

Quicken Deluxe product (Quicken Deluxe) and related documentation (including CD-ROM); Jan. 1994; (Joint 7873; 7915 to 7932; 7944 to 7952).

Quint, Barbara; "compact Cambridge/Cambridge Information Group; Cambridge Scientific Abstracts"; Database Searcher; vol. 8; No. 1; p. 20; Jan. 1992 (four pages).

Quint, Barbara; "Footsore Searcher Tours Online/CD-ROM '91 Exhibits: 'Day Three'"; Database Searcher; vol. 8; No. 2; p. 10; Feb. 1992 (nineteen pages).

Raggett, David; HTML+ (Hypertext Markup Language); pp. 1-31; WWW Discussion Group Request for Comments; Jul. 12, 1993.

Reality's "Wealth Builder 3.0 by Money Magazine"; User's Guide and floppy disks; 1992 (Joint 7911 to 7913; 7933 (twenty-six pages); 7934 (one hundred, fifty-eight pages); 7935 (User's Guide; three hundred, thirty-seven pages)).

Reference Manual Revised Edition; West CD Rom Libraries; 1989; (Joint 009465 to 9686).

Reisman, Richard R.; "CD-ROM/Online Hybrids, The Missing Link:?"; CD-ROM Professional; vol. 8; No. 4; Apr. 1995 (nine pages).

Rescorla, E. et al.; "The Secure HyperText Transfer Protocol"; Jun. 1994 (twenty-three pages).

Research Institute of America; RIA OnPoint; Jan. 1993 (Joint 7881).

Richman, Barry; "Online or Ondisc? When to Choose CD-ROM for your Database"; CD-ROM Professional; pp. 53-54; Mar. 1993.

Rogers, Scot P.; "Citations from Business Dateline Thru 1998: BD1"; Feb. 5, 2002 (thirty-eight pages).

Rogers, Scot P.; "Citations from Inform:Inf"; Feb. 5, 2002 (ten pages).

Rogers, Scot P.; "Citations from Promt-Predicasts:PM3"; Feb. 5, 2002 (four pages).

Rubenstein, Robert et al.; "CD-ROM Update: Tax Information of CD-ROM"; The Tax Adviser; No. 1; vol. 24; p. 59; Jan. 1993 (four pages).

Salamone, Salvatore; "Electronic software Distribution: Diamond in the Rough"; Data Communications; pp. 109-116; Mar. 1993 (Joint 003794 to 003799).

Scenarios 1-6 and SAM Screen Captives; (Jul. 1, 1993); (Joint 9216-9229).

Schneider, Marc; "What is Teletext?"; Philips Semiconductors Video Products; pp. 2-204 to 2-212; Jun. 1994 (nine pages).

Scisco, Peter; "Pigskin preview; computer football games; Software Review; Evaluation"; Computel; vol. 14; No. 6; p. 92; Sep. 1992 (Joint 7905 to 7910).

Sherman, Christopher V. et al.; "Exploring Hybrid World of CD-ROM/On-Line Products"; Multimedia Week; vol. 3; No. 10; Mar. 7, 1994 (Joint 7731 to 7738).

Simon, Barry; "Pipeline: Enter the Internet"; PC Magazine; p. 46; Feb. 8, 1994 (Joint 003811).

Slay, Alan L.; "Money Management Cures"; MacWorld; pp. 152-158; Mar. 1991 (Joint 003812 to 003818).

Smith Jr., Kime H. et al.; "Accessing Multimedia Network Services"; IEEE Communications Magazine; pp. 72-80; May 1992.

Software Dispatch CD and Related Documentation; 1993 (Joint 009733 to 009737).

Stangenes, Sharon; "'First' teams up with Microsoft on home banking"; Chicago Tribune; Nov. 19, 1993 (Joint 010826).

Steinberg, Jeffrey A.; "GeoQuery"; MacUser; vol. 8; No. 10; p. 58; Oct. 1992 (Joint 003831 to 003833).

Sugawara, Sandy; "Microsoft's very big ballpark estimate; Software giant's 'complete baseball' opens a window on its ambitious on-line plans"; Washington Post; p. C1; May 7, 1994 (Joint 003834 to 003836).

Swenson, John; "Banking through home computer has arrived"; Journal American; May 23, 1994 (Joint 010821).

Swenson, John; "Software you can bank on; Microsoft, U.S. Bank to put financial services within modem's reach"; Journal American; Dec. 7, 1993 (Joint 010825).

USA Today; "Keyboards Dream Teams"; sec. Bonus; p. 4E; Aug. 30, 1991 (Joint 7896 to 7897).

Vaughn, Mary A. et al.; "Publishing on CD-ROM: The NautilusCD Experience"; CD-ROM Professional; vol. 7; No. 3; pp. 59-68; May/Jun. 1994 (Joint 003837 to 003843).

Vogt, Sjoerd; "CD-ROM and Online-competitors or Compatriots? An Online Host's Point of View"; Online Information 92; pp. 33-45 (David I. Raitt ed., 16th International Online Information Meeting Proceedings, London, Dec. 8-10, 1992); (Joint 7858 to 7871).

Walnut Creek CD-ROM, FreeBSD (FCD) and related documentation; May 1994 (Joint 7877).

Warner, Jack; "Sports Computer Games; Several new football games out"; The Atlanta Journal and Constitution; p. F2; Nov. 17, 1991 (Joint 7901 to 7902).

Warner, Paul D.; "Tax Services and Tax Forms on CD-ROM"; CPA Journal; at 48; Nov. 1993 (Joint 7752 to 7756).

Warner, Paul D.; "A Follow-up On CD-ROM Tax Services (The CPA & the Computer)"; The CPA Journal Online; Jan. 1995 (four pages).

Weinert, Bryan; "CD-ROM Technology, Past, Future"; Jan. 23, 2002 (three pages).

West's CD-Rom Communique Special Issue; Spring 1991 (Joint 009708 to 009710).

Apple Computer, Inc.; Apple Reference and Presentations Library, Version 5.0, Reseller Edition; (1990) (8 pages).

Intuit Inc.; Advertisement and related material, Quicken for Windows CD-ROM Deluxe Edition related material; (1993) (8 pages).

Litigation materials from Case No. C 02-2878 (VRW) filed on Jun. 14, 2002, including Intuit Inc.'s Preliminary Invalidity Contentions (1 page); Electronic Art Inc.'s Preliminary Invalidity Contentions (two pages); "Exhibit B" Prior Art Bibliography (4 pages); and Intuit/EA/Symantec Prior Art tables (15 pages).

Premise Notebook Screen Captures (1991) (4 pages).

Premise: Quick Reference Card; (1991) (10 pages).

Premise: QuickScan on Premise; (1991) (2 pages).

Premise Software; Training Course Enclosed; (1991) (6 pages).

H&R Block Digital Tax Solutions LLC F/K/A/ H&R Block Digital Tax Solutions, Inc. and Block Financial Corporation's Preliminary Unenforceability Contentions dated Jul. 3, 2008, in *Disc Link Corporation* v. *H&R Block Digital Tax Solutions et al.*, Case No. 5:06-CV-00295-DF in the U.S. District Court for the Eastern District of Texas, Texarkana Division.

\* cited by examiner

K-S Particle Found

Two physicists announced that they had found the
K-S particle. If confirmed, this will verify the theory
of the Nobel laureates, Professors Kendrick Chan
and Sophia Chan, who first postulated the existence
of the K-S particle ten years ago. The physicists,
Drs. Lisa Smith and John Doe, showed computer
generated results indicating the detection of the K-S
particles in a series of experiments carried out at the
International Super-High Energy Accelerator.

FIG. 2A

K-S Particle Found¶ ¶  Two physicists announced that they had found the ϒ'K-S particle'ϒ'✕FE330AB✕. If confirmed, this will verify the theory of the Nobel laureates, Professors ϒ'Kendrick Chan'ϒ'✕A245DC8✕ and ϒ'Sophia Chan'ϒ'✕85AC258✕, who first postulated the existence of the K-S particle ten years ago. The physicists, Drs. ϒ'Lisa Smith'ϒ'✕3098BE6z✕ and ϒ'John Doe'ϒ'✕EAC7835✕, showed computer generated results indicating the detection of the K-S particles in a series of experiments carried out at the ϒ'International Super-High Energy Accelerator'ϒ'✕C347A49✕.¶

FIG. 2B

INFORMATION DISTRIBUTION AND PROCESSING SYSTEM

This application is a continuation of application Ser. No. 10/322,624, filed Dec. 19, 2002 now U.S. Pat. No. 7,181,758; which is a continuation of application Ser. No. 10/079,257, filed Feb. 19, 2002 (now abandoned); which is a continuation of application Ser. No. 09/699,022, filed Oct. 27, 2000 (now abandoned), which is a continuation of application Ser. No. 09/480,226, filed Jan. 10, 2000 (now U.S. Pat. No. 6,347,215); which is a continuation of Ser. No. 08/939,368, filed Sep. 29, 1997 (now U.S. Pat. No. 6,021,307); which is a continuation-in-part of application Ser. No. 08/644,838, filed May 10, 1996 (now abandoned); which is a continuation-in-part of application Ser. No. 08/279,424, filed Jul. 25, 1994 (now abandoned); all of which are incorporated by reference herein.

FIELD OF THE INVENTION

The invention relates generally to information distribution, and more particularly to distributing information using a broadcast channel and a bi-directional communication channel.

BACKGROUND OF THE INVENTION

Recent advancements in modem and computer technology allow large amounts of digital data to be transmitted electronically. A number of information providers (such as newspaper and magazine publishers) and on-line information distributors have formed partnerships to deliver newspaper and other information on-line. In this system, a subscriber uses a computer and a modem to connect, through a regular phone line, to the computer of an on-line information provider. The subscriber can retrieve information, including newspaper articles, stored in the computer of the information provider.

On-line delivery of newspaper has many advantages. For example, the information can be updated throughout the day while the printed version is printed only once or twice a day. Further, it is possible to do text-based searches on the information. However, it is found that on-line delivery of newspaper and other information is slow. For example, a subscriber has to wait many seconds for a newspaper article to be delivered. The quality of the electronic newspaper is low. For example, in order to reduce storage and communication requirements, graphic images appearing in the printed version are not universally supplied in the on-line version of newspaper. One of the reasons for such poor performance is the limited bandwidth of communication channels used by on-line information distributors. Another reason is that information is centrally processed by the computer at the site of the information distributor, with the result that each subscriber only gets a small slice of the time of the computer.

SUMMARY OF THE INVENTION

The present invention uses two channels to deliver digital information: a broadcast channel and a bi-directional channel. The broadcast channel is used to deliver the bulb of the digital information to subscribers. The amount of information delivered is preferably sufficient to satisfy the needs of a large number of subscribers so that they do not have to obtain additional information using the bi-directional channel. The broadcasted information is stored on fast storage media located at subscriber sites. As a result, search and retrieval of the broadcasted information is quick. Further, the broadcasted information is processed locally using a dedicated on-site processor instead of relying on the computers of the information distributors. As a result, the load on the computers of the information distributors is reduced. If the subscribers desire to receive additional information relating to the broadcasted information, the bi-directional communication channel is used to transmit the request and the requested information.

The distribution costs of broadcast channels are typically much lower than that of a bi-directional communication channel. Consequently, the major portion of information is delivered using low cost distribution channels. For a large number of subscribers, the broadcasted information will provide all the information they normally need. Thus, expensive bi-directional communication channels are used only occasionally.

These and other features and advantages of the present invention will be fully understood by referring to the following detailed description in conjunction with the accompanying drawings.

BRIEF DESCRIPTION OF THE DRAWINGS

FIG. 2A shows a newspaper article as displayed on a monitor of the information distribution system shown in FIG. 1.

FIG. 2B shows the contents of the broadcast information which corresponds to the newspaper article of FIG. 2A.

DETAILED DESCRIPTION OF THE INVENTION

Figure 1:
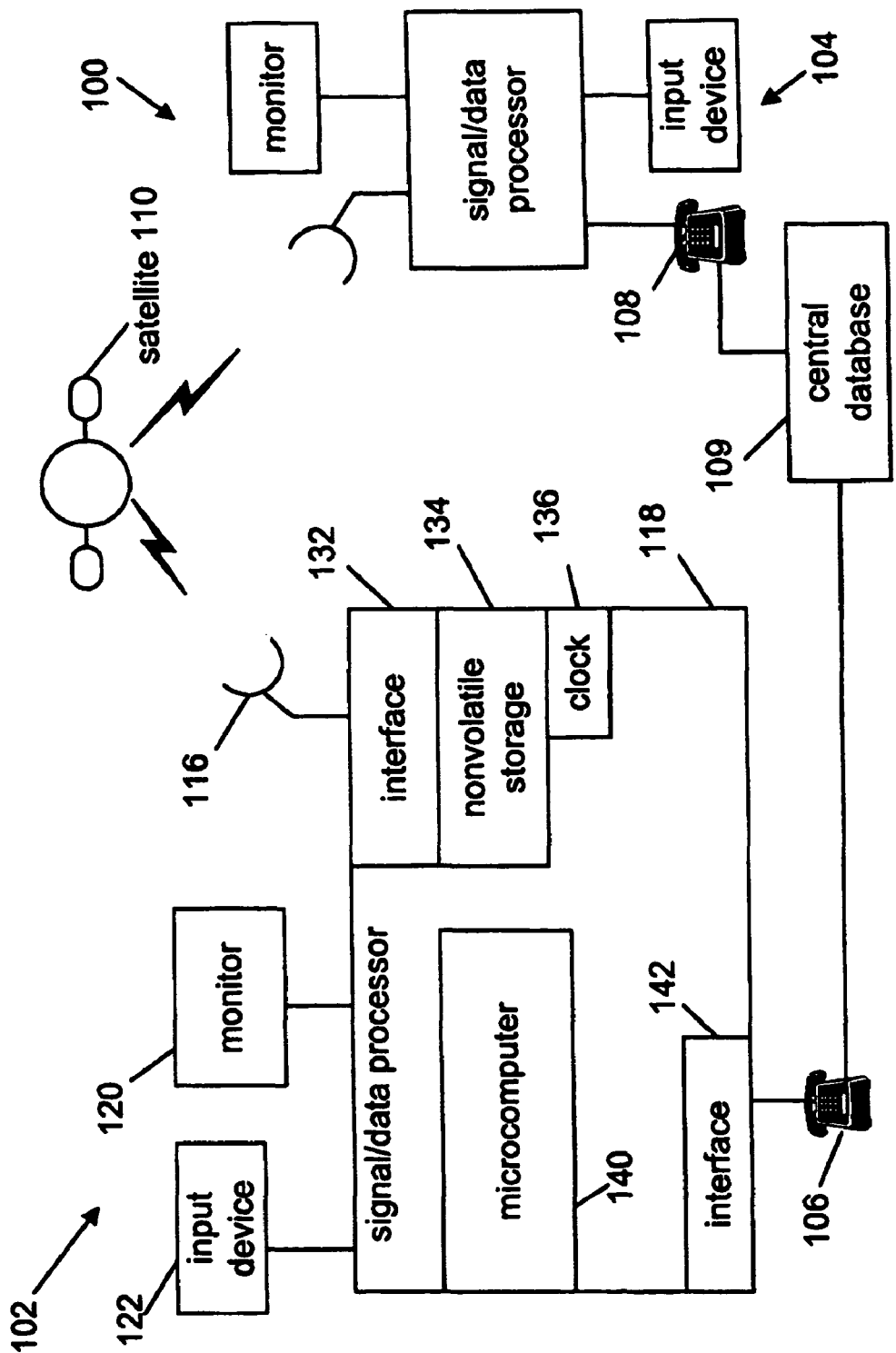
FIG. 1 is a schematic drawing showing an information distribution system of the present invention.

FIG. 1 is a block diagram of an information distribution system 100 in accordance with the present invention. In this embodiment, system 100 is designed to electronically distribute a newspaper. It should be pointed out that system 100 can also be used advantageously to distribute other types of information. System 100 contains a plurality of subscriber units (such as units 102 and 104) each connected to a bi-directional communication channel (e.g., telephone connections 106 and 108 coupled to units 102 and 104, respectively) and a satellite transponder 110 for broadcasting digital data to these subscriber units. Telephone connections 106 and 108 (which could be line-based or wireless) are coupled to a central database 109. In system 100, satellite transponder 110 is used to broadcast the content of a newspaper to the subscriber units while telephone connections 106 and 108 are used to provide additional information (stored in central database 109) to subscriber units 102 and 104, respectively, on a demand basis.

The structure of these subscriber units are substantially identical; consequently, only one of these units, such as unit 102, is described in detail. Unit 102 contains an antenna 116 for receiving broadcast signals from satellite transponder 110, a signal/data processor 118 for performing signal and data processing functions, a monitor 120 for displaying the electronic newspaper, and an input device 122 (such as a keyboard and/or a mouse).

Signal/data processor 118 contains a transponder interface 132 for processing transponder signal received from antenna 116. Transponder interface 132 typically contains a low noise receiver for receiving high frequency (e.g., C or Ku band) transponder signal and a "universal data interface" for converting the transponder signal to digital data. The retrieved data is stored in nonvolatile storage 134, such as a hard disk or solid state flash memory. Preferably, satellite transponder 110 broadcasts the newspaper data at predetermined times. Thus, a real-time clock 136 is preferably used to turn on interface 132 at the predetermined times. Processor 118 contains a microcomputer 140 which coordinates the operation of clock 136, nonvolatile storage 134, and interface 132. Processor 118 also contains a communication interface 142 for sending and receiving digital data from central database 109 through telephone connection 106.

The time for broadcast is preferably chosen when communication load of transponder 110 is at a low level (e.g., around mid-night). As a result, the cost of information delivery is low. Alternatively, the time of broadcasting is chosen by transponder 110 because it knows when communication load is light. In this case, transponder 110 first sends a signal to signal/data processor 118 for alerting processor 118 to receive and process the newspaper information.

A user can use the input device 122 and monitor 120 to read the content of the electronic newspaper stored in nonvolatile storage 134. In this embodiment, the complete content of the newspaper is stored in nonvolatile storage 134. The term "complete content" means that the user is able to read the newspaper without relying on information stored in central database 109 (although other embodiments may deliver less than the complete content). In this aspect, system 100 functions in a similar way as the distribution of a conventional printed newspaper. However, the digital data of the electronic newspaper delivered by satellite transponder 110 preferably contains linkage reference which allows fast retrieval of additional information from central database 109.

If the newspaper information received from satellite transponder 110 is sufficient to satisfy the needs of a user, signal/data processor 118 will not activate telephone connection 106. However, if the user wishes to receive additional information relating to an item mentioned in the electronic newspaper (e.g., by selecting at the item using the input device), process 118 will retrieve the information stored in central database 109 using the embedded linkage reference.

In system 100 of the present invention, the complete content of the electronic newspaper (including graphics and other multimedia contents, if delivered) is stored in nonvolatile storage 134, which has fast access time. Further, a dedicated processor (i.e., microcomputer 140) is used to process newspaper information. On the other hand, prior art on-line newspaper distribution systems rely on modem to deliver the content of the newspaper stored in a central site. Further, the processor in the central site has to serve many users in delivering the newspaper. As a result, system 100 has superior performance compared to the prior art on-line newspaper delivery systems.

If it is desirable to limit circulation of the newspaper to a certain class of subscribers only (e.g., paid subscribers), the data transmitted by transponder 110 could be encrypted. As a result, only subscribers who have a decryption key are able to read the newspaper. In this case, microcomputer 140 also performs decryption functions.

FIG. 2A shows an example of a portion of a newspaper article as seen on monitor 120. In FIG. 2A, the terms which a user may obtain additional information are underlined (or highlighted in other ways, such as setting in different colors, depending on the choice of the publisher). If desired, the user may select these terms using a pointing device, such as a mouse, and signal/data processor 118 will obtain the additional information from central database 109.

FIG. 2B shows the same portion in FIG. 2A as transmitted by transponder 110 (for simplicity, the embedded formatting codes, such as center, bold, etc., are not shown). Each of the terms underlined in FIG. 2A are enclosed by a special symbol (e.g., the "Υ" symbol) and followed by a linkage reference enclosed by another special symbol (e.g., the "✖" symbol). These symbols are invisible to the users and is recognizable only by microcomputer 140.

When an underlined term in FIG. 2A is selected by a user, microcomputer 140 extracts the linkage reference and transmits it to central database 109. The linkage reference allows central database 109 to retrieve the necessary information quickly without doing extensive searches. As a result, the response time of system 100 is fast. The retrieved information can itself contain linkage references and can be searched.

If the speed of searching and retrieving data by central database 109 is fast, it may not be necessary to include linkage reference in the information broadcasted by transponder 110. In this case, the user selects (e.g., using the mouse) words and terms he/she is interested in. Signal/data processor 118 transmits the selected items to central database 109, which searches for matches in its database. Matched information is sent to subscriber unit 102 for processing.

The bi-directional channel also allows updating of the broadcasted information. There is typically a time difference between the broadcast and display of information. New information gathered during this time difference can be stored in central database 109 and later transmitted to signal/data processor 118.

In this embodiment of the present invention, satellite transponder 110 is used as the vehicle to electronically broadcast newspaper. However, other broadcast distribution methods can be used. In the present invention, broadcast is defined as one-to-many distribution of information. The broadcast distribution channels do not have to be electrical. For example, the present invention allows the distribution of CDROMs encoded with digital information to the subscriber sites. In the case of electrical broadcast communication channels, both wired and wireless can be used. Preferably, unidirectional channels are used for broadcast because of their low cost; however, the present invention does not preclude the use of bi-directional communication channels (such as telephone lines) as means for distributing broadcast (i.e., one to many) information.

Current technology allows the size of antenna 116 to be as small as 2 feet. The costs of antenna 116 and transponder interface 132 is already low enough to be within the reach of small business or a typical household. The newspaper publisher has to pay for the use of the transponder. However, the cost is comparable to the printing and distribution costs of printed newspaper. It is anticipated that the costs of the newspaper distribution system in accordance with the present invention will be lowered as the number of subscribers increases.

Figure 3:
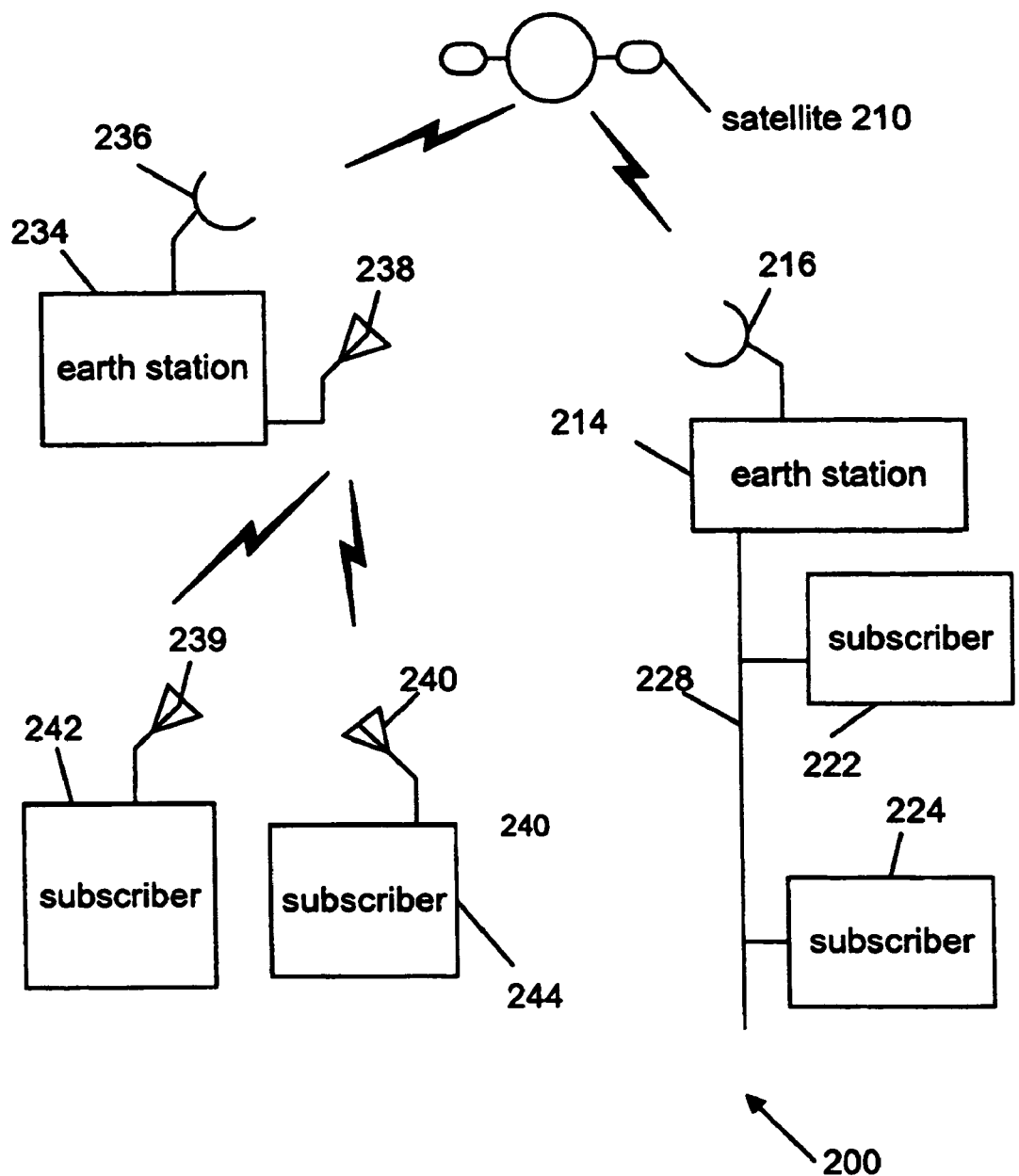
FIG. 3 shows another embodiment of the information distribution system of the present invention.

FIG. 3 shows another embodiment of a newspaper distribution system 200 of the present invention. System 200 contains a satellite transponder 210, an earth station 214, and a plurality of subscriber units, such as units 222 and 224. Transponder 210 functions in a similar way as transponder 110 of FIG. 1 and subscriber units 222 and 224 function in a similar way as subscriber units 102 and 104 of FIG. 1. Earth station 214 receives digital data transmitted by transponder 210 using an antenna 216. The data is distributed to subscriber units 222 and 224 via wired communication channel 228, such as cable and optic fiber. Other earth stations could be placed in strategic locations throughout the country to serve their respective subscribers in a similar manner as earth station 214 and subscriber units 222 and 224. As a result, a large geographic area can be served simultaneously by satellite transponder 210. The advantage of this embodiment is that the equipment costs incurred by the subscriber units are low.

In some locations, it may not be desirable to use wired communication channel to link an earth station to subscribers. In such case, wireless communication channel could be used. FIG. 3 shows an earth station 234 which receives transponder signal from transponder 210 using an antenna 236. Earth station 234 in turn broadcasts the digital data to its subscribers, such as subscriber units 242 and 244.

In one embodiment of system 200, teletext technology is used to link earth station 234 and subscriber units 242 and 244. Thus, earth station 234 could be located adjacent to a television transmission station. The digital data received by earth station 234 can be integrated to the vertical blanking interval of a TV signal, which is broadcasted using an antenna 238. Subscriber units 242 and 244 receive the signal using antennas 239, and 240, respectively. The digital data is then retrieved. Various improvements and refinements of the teletext technology are well known and can be incorporated into system 200.

It should be obvious to a person skilled in the art that systems 100 and 200 are not limited to the distribution of a newspaper. Further, electronic newspapers of the future may contain contents which are not available in the printed version, such as video and other multimedia compositions. Other information, such as magazines, graphic images, electronic mails, computer games, multimedia work, or interactive movies, could also be advantageously distributed using a system similar to systems 100 and 200. For example, if it is desirable to distribute interactive movies, the non-interactive portion can be broadcasted while the interactive portion is delivered using a bi-directional channel.

There has thus shown and described a novel information distribution system. Many changes, modifications, variations and other uses and applications of the subject invention will become apparent to those skilled in the art after considering this specification and the accompanying drawings. All such changes, modifications, variations, uses, and applications are covered by the scope of this invention which is limited only by the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   sending an electronic mail from a computer to a receiving device in a remote site, the electronic mail comprising a first set of digital data displayable on a display and a second set of digital data not shown in the electronic mail, the first set of digital data including a first set of displayable data and a second set of displayable data, the second set of digital data including a first set of characters contiguous to the second set of displayable data, the second set of digital data comprising at least one link associated with at least a portion of the second set of displayable data and a second set of characters contiguous to the at least one link and designating a presence of the at least one link, the first and second sets of characters recognizable by a processor of the receiving device and not shown in the electronic mail;
   receiving at least a portion of the at least one link from the receiving device by a data storage device away from the remote site, the data storage device storing a third set of digital data; and
   retrieving, after the receiving at least a portion of the at least one link from the receiving device, at least a portion of the third set of digital data stored in the data storage device and delivering the at least a portion of the third set of digital data to the receiving device.

2. The method of claim 1, further comprising encrypting at least one of the first set of digital data and the third set of digital data.

3. The method of claim 1, further comprising receiving data by the computer from the receiving device.

4. The method of claim 1, further comprising periodically updating the third set of digital data.

5. The method of claim 1, further comprising formatting the at least a portion of the second set of displayable data associated with the at least one link to have a first format and formatting the first set of displayable data to have a second format different than the first format.

6. The method of claim 1, further comprising transmitting to the receiving device the at least a portion of the third set of digital data retrieved from the data storage device with at least another link associated with a fourth set of digital data.

7. The method of claim 6, further comprising formatting the at least a portion of the third set of digital data associated with the at least another link to have a first format and formatting the first set of displayable data to have a second format different than the first format.

8. The method of claim 1, further comprising embedding the at least one link in the first set of digital data.

9. The method of claim 1, further comprising wirelessly sending the electronic mail from the computer to the receiving device.

10. A method comprising:
    sending an electronic mail from a computer to a receiving device in a remote site, the electronic mail comprising a first set of digital data displayable on a display and a second set of digital data not shown in the electronic mail, the second set of digital data comprising at least one link associated with at least a portion of the set of digital data and a first set of characters contiguous to the at least one link and designating a presence of the at least one link to a processor of the receiving device;
    receiving at least a portion of the at least one link from the receiving device, by a data storage device where a third set of digital data is stored; and
    retrieving, after the receiving the at least a portion of the at least one link from the receiving device, at least a portion of the third set of digital data from the data storage device, the at least a portion of the third set of digital data retrieved from the data storage device including at least another link associated with a fourth set of digital data.

11. The method of claim 10, further comprising encrypting at least one of the first set of digital data and the third set of digital data.

12. The method of claim 10, further comprising formatting the at least a portion of the first set of digital data associated with the at least one link to have a first format and formatting a second portion of the first set of digital data not associated with the at least one link to have a second format different from the first format.

13. The method of claim 10, further comprising embedding the at least one link in the first set of digital data.

14. The method of claim 10, wherein the sending an electronic mail includes sending the second set of digital data further comprising a second set of characters contiguous to the at least a portion of the first set of digital data and recognizable by the processor of the receiving device.

15. The method of claim 10, wherein the receiving at least a portion of the at least one link from the receiving device includes receiving the at least a portion of the at least one link by a database.

16. The method of claim 1, wherein the receiving at least a portion of the at least one link from the receiving device includes receiving the at least a portion of the at least one link by a database.

* * * * *

UNITED STATES PATENT AND TRADEMARK OFFICE
CERTIFICATE OF CORRECTION

| | |
|---|---|
| PATENT NO. | : 7,840,176 B2 |
| APPLICATION NO. | : 11/644492 |
| DATED | : November 23, 2010 |
| INVENTOR(S) | : Hark C. Chan |

Page 1 of 1

It is certified that error appears in the above-identified patent and that said Letters Patent is hereby corrected as shown below:

Title Page 2, Section (56), Column 1, U.S. Patent Documents:
Line 17: change "Sclafy" to -- Schafly --.

Title Page 7, Section (56), Column 1, Other Publications:
Line 48: change "vo." to -- vol. --.

Title Page 8, Section (56), Column 1, Other Publications:
Line 45: change "Cv" to -- CV --.

Column 6:
Line 26: change "the set" to -- the first set --; and
Line 31: change "device, by" to -- device by --.

Signed and Sealed this
Tenth Day of May, 2011

David J. Kappos
*Director of the United States Patent and Trademark Office*